(12) United States Patent
Thakker

(10) Patent No.: US 11,763,222 B2
(45) Date of Patent: Sep. 19, 2023

(54) SYSTEM AND METHOD FOR EVENT PLANNING AND MANAGEMENT

(71) Applicant: Stellar IT Solutions, Rockville, MD (US)

(72) Inventor: Dipak Thakker, Rockville, MD (US)

(73) Assignee: STELLAR IDEA LABS, Rockville, MD (US)

( * ) Notice: Subject to any disclaimer, the term of this patent is extended or adjusted under 35 U.S.C. 154(b) by 0 days.

(21) Appl. No.: 17/343,757

(22) Filed: Jun. 10, 2021

(65) Prior Publication Data

US 2022/0058550 A1 Feb. 24, 2022

Related U.S. Application Data

(60) Provisional application No. 62/706,526, filed on Aug. 22, 2020.

(51) Int. Cl.
*G06Q 10/02* (2012.01)
*G06Q 10/0631* (2023.01)
(Continued)

(52) U.S. Cl.
CPC ......... *G06Q 10/06313* (2013.01); *G06N 5/04* (2013.01); *G06N 20/00* (2019.01);
(Continued)

(58) Field of Classification Search
CPC ............ G06Q 10/02; G06Q 10/06312; G06Q 10/087; G06Q 10/10; G06Q 20/3825; G06Q 30/018; G06Q 30/0201; G06Q 30/0631
(Continued)

(56) References Cited

U.S. PATENT DOCUMENTS 7,236,976 B2 6/2007 Breitenbach et al.
7,685,025 B2 3/2010 Islam
(Continued)

FOREIGN PATENT DOCUMENTS

CA 2807765 A1 * 8/2013 .......... G06Q 10/087
WO 2014/210162 A1 12/2014
WO WO-2016103136 A1 * 6/2016 ............. G06Q 10/00

OTHER PUBLICATIONS

"Four Digital Transformation Trends leveraged by the Hospitality Industry", Apr. 23, 2019, emtec.digital, 5 pages (Year: 2019).*
(Continued)

*Primary Examiner* — Shannon S Campbell
*Assistant Examiner* — Freda A Nelson
(74) *Attorney, Agent, or Firm* — Dave Law Group LLC; Raj S. Dave

(57) ABSTRACT

Embodiments relate to a system and method for event planning and management. The method comprises: receiving details of the customer; receiving an enquiry for one or more event venues, rooms, and services; receiving details of vendors, from a database of vendors; generating recommendations of one or more event venues, rooms, and services from the database of vendors based on the enquiry for one or more event venues, rooms, and services; displaying a real-time inventory of the recommendations of one or more event venues, rooms, and services; receiving a selection of one or more event venues, rooms, and services; and generating a booking of the selection of one or more event venues, rooms, and services, for executing an event. The booking generated includes the event as well as the services to execute the event.

20 Claims, 15 Drawing Sheets

(51) Int. Cl.

| | | |
|---|---|---|
| *G16Y 10/45* | (2020.01) | |
| *G06Q 30/0201* | (2023.01) | |
| *G06Q 10/087* | (2023.01) | |
| *G06Q 30/0601* | (2023.01) | |
| *G06Q 20/38* | (2012.01) | |
| *G06Q 30/018* | (2023.01) | |
| *G06Q 50/16* | (2012.01) | |
| *G06Q 10/10* | (2023.01) | |
| *G06N 5/04* | (2023.01) | |
| *G06N 20/00* | (2019.01) | |
| *G16Y 10/75* | (2020.01) | |
| *H04L 67/55* | (2022.01) | |

(52) U.S. Cl.
CPC ....... *G06Q 10/02* (2013.01); *G06Q 10/06312* (2013.01); *G06Q 10/087* (2013.01); *G06Q 10/10* (2013.01); *G06Q 20/3825* (2013.01); *G06Q 30/018* (2013.01); *G06Q 30/0201* (2013.01); *G06Q 30/0631* (2013.01); *G06Q 30/0637* (2013.01); *G06Q 50/163* (2013.01); *G16Y 10/45* (2020.01); *G16Y 10/75* (2020.01); *H04L 67/55* (2022.05)

(58) Field of Classification Search
USPC .......................................... 705/5, 26.1, 7.19
See application file for complete search history.

(56) References Cited

U.S. PATENT DOCUMENTS

| | | | |
|---|---|---|---|
| 7,774,224 B2 | 8/2010 | Xiao et al. | |
| 9,678,627 B2* | 6/2017 | Kernick | G06Q 10/109 |
| 10,524,009 B2 | 12/2019 | Christensen et al. | |
| 10,600,105 B1* | 3/2020 | Kumar | G06Q 30/0611 |
| 2008/0133286 A1* | 6/2008 | Islam | G06Q 30/02 705/5 |
| 2009/0254971 A1* | 10/2009 | Herz | G06Q 30/0603 726/1 |
| 2013/0173317 A1 | 7/2013 | Higgy | |
| 2014/0025421 A1* | 1/2014 | Sen | G06Q 10/06313 705/7.23 |
| 2014/0172483 A1 | 6/2014 | Bellers et al. | |
| 2014/0279196 A1* | 9/2014 | Wilson | G06Q 30/0631 705/26.7 |
| 2015/0112738 A1* | 4/2015 | Marinaro | G06Q 10/02 705/5 |
| 2015/0227856 A1* | 8/2015 | Hoang-To | G06Q 30/0283 705/5 |
| 2015/0248651 A1* | 9/2015 | Akutagawa | G06F 16/2465 705/7.19 |
| 2015/0254580 A1 | 9/2015 | Gupta et al. | |
| 2016/0078502 A1* | 3/2016 | Sedky | G06Q 10/02 705/347 |
| 2016/0098687 A1* | 4/2016 | Lamons | G06Q 10/1095 705/7.19 |
| 2016/0225108 A1* | 8/2016 | Fishberg | G06Q 30/0283 |
| 2017/0228804 A1* | 8/2017 | Soni | G06Q 30/0641 |
| 2018/0011859 A1 | 1/2018 | Hallinan et al. | |
| 2019/0095882 A1 | 3/2019 | Parker et al. | |
| 2020/0167699 A1 | 5/2020 | Cohen | |
| 2020/0334586 A1* | 10/2020 | Petroulas | H04L 47/827 |

OTHER PUBLICATIONS

Andrew Arnold, "How AI Is Transforming The Event Planning Space One Conversation At A Time", Feb. 25, 2019,04:56pm EST, forbes.com, 4 pages. (Year: 2019).*

Courtney Gabrielson, "DC Tech Madness Winner STYCKIE: Victory 'Feels Tremendous'", Jun. 6, 2018 10:10am EDT, 4 pages. (Year: 2018).*

* cited by examiner

SEARCH WINDOW

| TYPE OF EVENT | CHOOSE DATE __/__/__ | LOCATION | EVENT DURATION |

| DISTANCE | GUESTS |

SEARCH

FIG. 8

SYSTEM AND METHOD FOR EVENT PLANNING AND MANAGEMENT

CROSS-REFERENCE TO RELATED APPLICATIONS

This application claims the benefit under 35 U.S.C § 119 of U.S. Provisional Application No. 62/706,526, filed on 22 Aug. 2020, which is hereby incorporated by reference in its entirety.

FIELD OF THE INVENTION

This invention relates to a system and method for event planning and management. The invention particularly relates to a system and method for event planning and management that is real-time and is a one stop consolidator for event planning.

BACKGROUND

"Systems and methods for group event and service coordination are provided, including Smart Chats, which connect user accounts to tools for intelligently finding tickets for sale, cost splitting, accessing related events and services, and sharing media. The systems and methods further implement artificial intelligence to match non-connected user accounts and provide event and service recommendations to connected user accounts." [Source: Event management and co-ordination platform; Eli Cohen; published as US20200167699A1 on May 28, 2020]

"Systems and methods are provided for enabling event planning and promotion using on-line collaboration tools among a group of people, wherein the group arrives at a decision, such as a decision as to the nature and/or logistics corresponding to an event in which the group wishes to participate, and wherein the collaboration tools include the ability to provide links to perform transactions related to the defined event." [Source: System and Method for On-Line Event Promotion and Group Planning; Shifar Farid; published as WO2014210162A1 on Dec. 31, 2014]

"Multi-level network-based access is coordinated. Multiple downloadable first software applications configured to provide a first class of service are distributed over a communications network. A centralized computer system coordinates access between the first software applications and the second software applications, such that access between any of the first software applications and the second software applications is controlled by and through confirmation of the centralized computer system. Services on behalf of the first software applications are provided by the centralized computer system to the second software applications once access between a first software application and a second software application is confirmed." [Source: Multi-level network-based access coordination; Duncan Parker; published as: US20190095882A1 on Mar. 28, 2019"

"A web-based or computer-implemented system for planning and managing events such as weddings, bar mitzvahs, parties, and any other events involving multiple service providers or vendors including, but not limited to, caterers, entertainers, limousine drivers, and so forth, by means of a single website or portal and forms or contracts that can be customized to meet the service offerings, policy requirements, and pricing structures of individual providers or vendors." [Source: Web-based integrated event planning and management system and method; Shazed Islam; published as U.S. Pat. No. 7,685,025B2 on Jun. 5, 2008, and granted on Mar. 23, 2010]

"A networked database management system (DBMS) is disclosed. The DBMS may include a computer accessible data storage including a database, an access control module, a communication module, and a matching module. The data base may be remotely located from a plurality of user nodes and a plurality of venue nodes. The remote database may include a plurality of records, the records comprise: user node data, venue node data, and transaction data. The communication module may be in data communication with the data storage and may be configured to receive user node data and venue node data for storage in the database and query requests to retrieve user node data and venue node data from the database." [Source: Database and System For Venue Collaboration; Garry Hallinan, Carl Wagner, Jennifer Brown; published as US20180011859A1 on Jan. 11, 2018]

However, current systems and methods do not provide a single portal through which all steps of identifying a venue, selecting a caterer, coordinating with other vendors, incorporating last minute changes, tracking budget etc. can be done. Considering the knowledge of the persons skilled in the art, there is a long-felt need for a single one stop system for event planning and management that facilitates booking an event, booking the services within the budget, performing analysis on the booking done and receiving feedback.

SUMMARY

An embodiment relates to event planning and management, the method comprising receiving details of a customer through a user device; receiving an enquiry for one or more event venues, rooms, and services; receiving details of vendors, from a database of vendors; generating recommendations of one or more event venues, rooms, and services, from the database of vendors based on the enquiry for one or more event venues, rooms, and services; displaying a real-time inventory of the recommendations of one or more event venues, rooms, and services; receiving a selection of one or more event venues, rooms, and services; and generating a booking of the selection of one or more event venues, rooms, and services, for executing an event.

In one embodiment, receiving the details of the customer comprises receiving at least one of a name, an identifier, a password, a contact address, a telephone number, and an email-id.

In another embodiment receiving the details of the vendor comprises receiving at least one of a name, an identifier, a contact address, a telephone number, an email-id, and a database of event venues, rooms, and services.

In yet another embodiment, generating recommendations of the one or more event venues comprises generating recommendations of venues, the venues comprise hotels, banquet halls, plots, gardens, dining halls, cruise boats and ships, and heritage buildings.

In yet another embodiment, generating recommendations of services comprises generating recommendations of vendors, the vendors comprise: caterers, disc jockeys, photographers, videographers, entertainers, musicians, singers, decorators, and florists.

In yet another embodiment, the receiving of the enquiry comprises receiving a search query; the search query is filled in a form on a user device; and the search query comprises date of the event, time of the event, location for the event, type of event, number of attendees, type of food and beverages preferred and a budget for the event.

In yet another embodiment, generating recommendations of the one or more event venues, rooms, and services comprises one of a statistical analysis, a machine learning algorithm, artificial intelligence, or a rule-based analysis; and the recommendations of one or more event venues, rooms, and services, are generated by using predictive data analytics based on a search pattern of one or more customers, on the one or more event venues, rooms, and services, along with a comparison of the one or more event venues, rooms, and services.

In yet another embodiment, the recommendations of one or more event venues, rooms, and services are derived from a variety of factors comprising a history of customer behavior, preferences, and interests.

In yet another embodiment, generating recommendations further comprises collecting information from search patterns and interactions from one or more customers through a collaborative filter mode.

In yet another embodiment, the generating recommendations further comprises keeping a track of a budget of cost of the customer for selection of the one or more event venues, rooms, and services.

In yet another embodiment, displaying the real-time inventory of the one or more event venues, rooms, and services comprises displaying, an inventory of the one or more event venues, an inventory of rooms, an inventory of one or more menus of food and beverages, an inventory of one or more customizable seating arrangements, and an inventory of one or more service vendors.

In yet another embodiment, the booking comprises generating a payment amount against the booking; receiving details of an online payment amount via the user device; generating an event order and a contract for the booking; delivering the event order and contract electronically to the customer as well as to the vendor; and approving the event order and the contract by receiving an electronic signature on the event order and the contract.

In yet another embodiment, the rooms comprise a guest room, conference room, meeting room, and banquet room.

In yet another embodiment, the method comprising integrating the generating recommendations of the one or more event venues, rooms, and services, displaying the real-time inventory of the recommendations of the one or more event venues, rooms, and services, and the booking of the one or more event venues, rooms, and services through a Property Management System (PMS).

In yet another embodiment, the method further comprises enabling visibility and easy accessibility of the one or more customer accounts through a Customer Relationship Management (CRM) unit to the vendor for reviewing availability of the one or more event venues, rooms, and services; and the Customer Relationship Management (CRM) unit enables analysis of the bookings done for the one or more event venues, rooms, and services.

In yet another embodiment, the method further comprises automating the booking of the event venue and services through Robotic Process Automation (RPA).

In yet another embodiment, the method comprises connecting, one or more beacons, Internet of Things (IOT) devices to one or more handheld devices, enabling communication with the one or more handheld devices, during the event; the communication comprises relay messages and push notifications.

Yet another embodiment, relates to a method for event planning and management, the method comprising receiving details of a customer through a user device; receiving a request for change in one or more event venues, rooms, and services; receiving details of vendors, from a database of vendors; generating alternative recommendations of the one or more event venues, rooms, and services based upon the request for change; displaying a real-time inventory of the alternative recommendations of the one or more event venues, rooms, and services; receiving a selection of one or more event venues, rooms, and services from the alternative recommendations; and generating a change in booking of one or more event venues, rooms, and services.

In yet another embodiment, a method for change in booking comprises adjusting the payment amount according to the change in the booking; generating an event order and a contract for the change in the booking; delivering the event order and contract electronically to the customer as well as to the vendor; and approving the event order and the contract by receiving an electronic signature on the event order and contract.

In yet another embodiment, relates to system for event planning and management, the system comprises a memory; and a processor coupled to the memory, the processor is configured to receive details of the customer through a user device; receive an enquiry for one or more event venues, rooms, and services; receive details of vendors from a database of vendors; generate recommendations of one or more event venues, rooms, and services from a database of vendors, based on the enquiry for one or more event venues, rooms, and services; display a real-time inventory of the recommendations of the one or more event venues, rooms, and services; receive a selection of one or more event venues, rooms, and services; and generate a booking of the one or more event venues, rooms, and services, for executing an event.

In yet another embodiment, the detail of the customer comprises at least one of a name, an identifier, a password, a contact address, a telephone number, and an email-id.

In yet another embodiment, the detail of the vendor comprises at least one of a name, an identifier, a contact address, a telephone number, an email-id, and a database of event venues, rooms, and services.

In yet another embodiment, the one or more event venues comprise: hotels, banquet halls, plots, gardens, dining halls, cruise boats and ships, heritage buildings, and the services comprise caterers, disc jockeys, photographers, videographers, musicians, singers, decorators, and florists.

In yet another embodiment, the enquiry comprises a search query; the search query is filled in via a user device; and the search query comprises a date of the event, time period of the event, specific area for the event venues, type of events, number of attendees, type of food preferred and a budget approximation for the event.

In yet another embodiment, the user device comprises at least one of a user interface, touchpad, touch screen, mobile device, web device, keypad, a third-party system via an Application Programming Interface (API).

In yet another embodiment, a recommendation engine generates the recommendations of one or more event venues, rooms, and services; the recommendation engine is at least one of a statistical analysis, a machine learning algorithm, artificial intelligence, or a rule-based analysis; the recommendations are generated by using predictive data analytics based on a search pattern of one or more customers, on the one or more event venues, rooms, and services, along with the comparison of the one or more event venues, rooms, and services.

In yet another embodiment, the recommendations by the recommendation engine are derived from a variety of factors comprising a history of customer behavior, preference, and interest.

In yet another embodiment, the recommendation engine operates in a collaborative filter mode; the collaborative filter mode collects information from search patterns and interactions from one or more customers.

In yet another embodiment, the recommendation engine keeps a track of a budget of cost of a customer for selection of the one or more event venues, rooms, and services.

In yet another embodiment, the real-time inventory of the one or more event venues, rooms, and services comprises an inventory of the one or more event venues, an inventory of rooms, an inventory of menus of food and beverages, an inventory of customizable seating arrangement, and an inventory of one or more service vendors.

In yet another embodiment, the processor is further configured to generate a payment amount against the booking; receive details of an online payment amount via the user device; generate an event order and a contract for the booking; deliver the event order and contract electronically to the customer as well as the vendor; and approve the event order and the contract by receiving an electronic signature on the event order and contract.

In yet another embodiment, the processor comprises an inbuilt customer relationship management (CRM) unit, the inbuilt customer relationship management (CRM) unit is configured to enable visibility and easy accessibility of one or more customer accounts to the vendor for reviewing the availability of the one or more event venues, rooms, and services; the inbuilt customer relationship management (CRM) unit enables analysis of the bookings done for one or more event venues, rooms, and services.

In yet another embodiment, the processor comprises a Robotic Process Automation (RPA) unit; the Robotic Process Automation (RPA) unit is configured to automate the booking of the one or more event venues, rooms, and services; generating an event order and a contract; delivering the event order and contract electronically to the customer as well as a vendor; and approving the event order and the contract by receiving an electronic signature on the event order and contract.

In yet another embodiment, the rooms comprise a guest room, conference room, meeting room, and banquet room.

In yet another embodiment, the processor is further configured to integrate the generating recommendations of one or more event venues, rooms, and services, displaying a real-time inventory of the recommendations of the one or more event venues, rooms, and services, and the booking of one or more event venues, rooms, and services with a Property Management System (PMS).

In yet another embodiment, the system is device-independent, and the system is deployed on multiple platforms comprising a web portal and a mobile application.

In yet another embodiment, the processor is configured to connect one or more beacons, IOT devices to one or more handheld devices, enabling communication with the one or more handheld devices, while the event is in progress. The one or more beacons, IOT devices enable communication through relay messages and through push notifications.

Yet another embodiment relates to a system for event planning and management, the system comprises a memory; and a processor coupled to the memory; the processor is configured to receive details of the customer; receive a request for change in one or more event venues and services; receive details of the customer; receive details of vendors from a database of vendors; generate an alternative recommendation of the one or more event venues, rooms, and services based upon the request for change; display a real-time inventory of the alternative recommendations of one or more event venues, rooms, and services; receive a selection of the one or more event venues, rooms, and services from the alternative recommendations; generate a change in the booking of the event.

In yet another embodiment, the processor is further configured to adjust the payment amount according to the change in the booking; generate an event order and a contract for the change in the booking; deliver the event order and contract electronically to the customer as well as to the vendor; and approve the event order and the contract by receiving an electronic signature on the event order and contract.

Yet another embodiment relates to a non-transitory computer storage medium storing a sequence of instructions, which when executed by a processor, causes receiving details of the customer through a user device; receiving an enquiry for one or more event venues, rooms, and services; receiving details of vendors from a database of vendors; generating recommendations of one or more event venues, rooms, and services, from the database of vendors, based on the enquiry for one or more event venues, rooms, and services; displaying a real-time inventory of the recommendations of one or more event venues, rooms, and services; receiving a selection of one or more event venues, rooms, and services; and generating a booking of the selection of one or more event venues, rooms, and services, for executing an event.

Yet another embodiment relates to a non-transitory computer storage medium storing a sequence of instructions, which when executed by a processor, causes receiving details of the customer; receiving a request for change in one or more event venues, rooms, and services;

receiving details of vendors from a database of vendors; generating an alternative recommendation of the one or more event venues, rooms, and services based upon the request for change; displaying a real-time inventory of the alternative recommendations of one or more event venues, rooms, and services; receiving a selection of one or more event venues, rooms, and services from the alternative recommendations; generating a change in a booking of one or more event venues, rooms, and services.

BRIEF DESCRIPTION OF THE FIGURES

The embodiments of this invention are illustrated by way of example and not limitation in the figures of the accompanying drawings, in which like references indicate similar elements and in which:

FIG. 8 illustrates an image of a search window for event planning and management, according to one or more embodiments.

DETAILED DESCRIPTION

Figure 1:
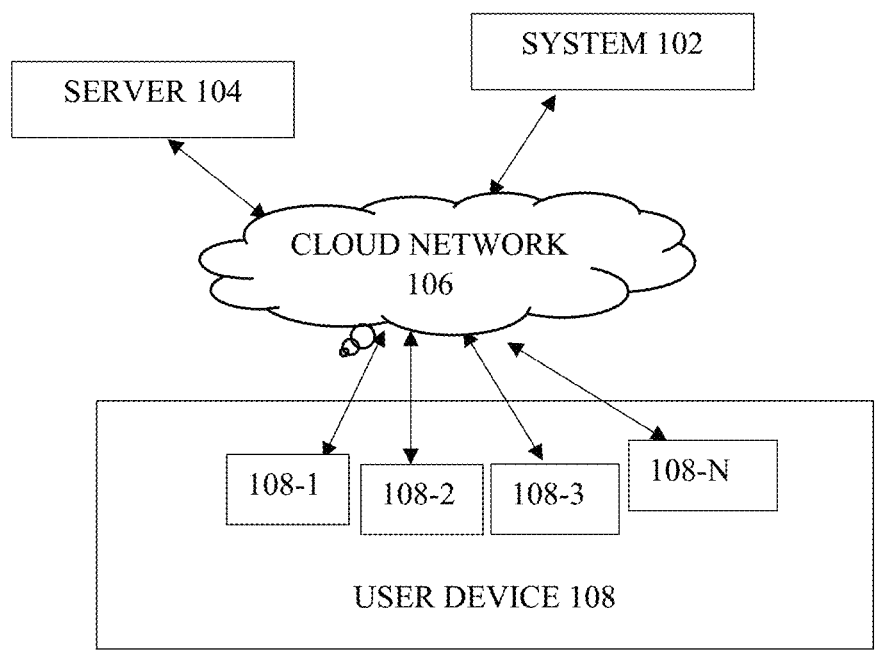
FIG. 1 illustrates a network implementation of a system for event planning and management, according to one or more embodiments.

In order to fully understand the scope of the invention, the following terms used herein are hereby defined.

The articles "a" and "an" are used herein refers to one or to more than one (i.e., to at least one) of the grammatical object of the article. By way of example, "an element" means one element or more than one element.

No element, act, or instruction used herein should be construed as critical or essential unless explicitly described as such. Also, as used herein, the articles "a" and "an" are intended to include items and may be used interchangeably with "one or more." Furthermore, as used herein, the term "set" is intended to include items (e.g., related items, unrelated items, a combination of related items, and unrelated items, etc.), and may be used interchangeably with "one or more." Where only one item is intended, the term "one" or similar language is used. Also, as used herein, the terms "has", "have", "having", or the like are intended to be open-ended terms. Further, the phrase "based on" is intended to mean "based, at least in part, on" unless explicitly stated otherwise.

The terms "first", "second", "third", "fourth", and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include", and "have", and any variations thereof, are intended to cover a non-exclusive inclusion, such that a process, method, system, article, device, or apparatus that comprises a list of elements is not necessarily limited to those elements but may include other elements not expressly listed or inherent to such process, method, system, article, device, or apparatus.

The terms "left", "right", "front", "back", "top", "bottom", "over", "under", and the like in the description and in the claims, if any, are used for descriptive purposes and not necessarily for describing permanent relative positions. It is to be understood that the terms so used are interchangeable under appropriate circumstances such that the embodiments of the apparatus, methods, and/or articles of manufacture described herein are, for example, capable of operation in other orientations than those illustrated or otherwise described herein.

The term "comprising", which is synonymous with "including", "containing", or "characterized by" here is defined as being inclusive or open-ended, and does not exclude additional, unrecited elements or method steps, unless the context clearly requires otherwise.

As used herein, the term "component" is intended to be broadly construed as hardware, firmware, and/or a combination of hardware and software.

As used herein, the term "API" stands for Application Programming Interface. It is an interface that defines interactions between multiple software applications or mixed hardware-software intermediaries. It defines the kinds of calls or requests that can be made, how to make them, the data formats that should be used, the conventions to follow, etc. It can also provide extension mechanisms so that users can extend existing functionality in various ways and to varying degrees. An API can be entirely custom, specific to a component, or designed based on an industry-standard to ensure interoperability. Through information hiding, APIs enable modularity, allowing users to use the interface independently of the implementation. Web APIs are now the most common meaning of the term API. There are also APIs for programming languages, software libraries, computer operating systems, and computer hardware.

As used herein, the term "IoT" stands for Internet of Things which describes the network of physical objects "things" or objects that are embedded with sensors, software, and other technologies for the purpose of connecting and exchanging data with other devices and systems over the internet.

As used herein "Machine learning" refers to algorithms that give a computer the ability to learn without being explicitly programmed including algorithms that learn from and make predictions about data. Machine learning algorithms include, but are not limited to, decision tree learning, artificial neural networks (ANN) (also referred to herein as a "neural net"), deep learning neural network, support vector machines, rule-based machine learning, random forest, etc. For the purposes of clarity, algorithms such as linear regression or logistic regression can be used as part of a machine learning process. However, it is understood that using linear regression or another algorithm as part of a machine learning process is distinct from performing a statistical analysis such as regression with a spreadsheet program. The machine learning process can continually learn and adjust the classifier as new data becomes available and does not rely on explicit or rules-based programming.

As used herein, the term "Dashboard" is a type of interface that visualizes particular Key Performance Indicators (KPIs) for a specific goal or process. It is based on data visualization and infographics, so it is linked to a database that allows constant updates. In some situations, the same term is used for progress reports.

As used herein, a "Database" is a collection of information that is organized so that it can be easily accessed, managed, and updated. Computer databases typically contain aggregations of data records or files.

As used herein, the term "Cloud" refers to servers that are accessed over the Internet, and the software and databases that run on those servers. Cloud servers are located in data centers all over the world. By using cloud computing, users and companies don't have to manage physical servers themselves or run software applications on their own machines.

As used herein, the term "Bots" refers to software applications that are programmed to do certain tasks. Bots are automated, which means bots run according to the instructions given.

Implementations may be realized in a computing system that includes a back-end component, e.g., as a data server, or that includes a middleware component, e.g., an application server, or that includes a front end component, e.g., a client computer having a graphical user interface or a Web browser through which a user may interact with an implementation, or any appropriate combination of one or more such back end, middleware, or front end components. The components of the system may be interconnected by any appropriate form or medium of digital data communication, e.g., a communication network. Examples of communication networks include a local area network ("LAN") and a wide area network ("WAN"), e.g., the Internet.

The computing system may include clients and servers. A client and server are generally remote from each other and typically interact through a communication network. The relationship of client and server arises by virtue of computer programs running on the respective computers and having a client-server relationship to each other.

Embodiments of the present invention may comprise or utilize a special purpose or general-purpose computer including computer hardware. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical computer-readable storage media and transmission computer-readable media.

Computer-executable instructions comprise, for example, instructions and data which cause a general-purpose computer, special purpose computer, or special purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described. Rather, the described features and acts are disclosed as example forms of implementing the claims.

Processors suitable for the execution of a computer program include, by way of example, both general and special purpose microprocessors, and any one or more processors of any appropriate kind of digital computer. Generally, a processor will receive instructions and data from a read only memory or a random-access memory or both. Elements of a computer can include a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, optical disks or solid-state disks. However, a computer need not have such devices. Moreover, a computer may be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media, and memory devices, including by way of example semiconductor memory devices, e.g., Erasable Programmable Read-Only Memory (EPROM), Electronically Erasable Programmable Read-Only Memory (EEPROM), and flash memory devices; magnetic disks, e.g., internal hard disks or removable disks; magneto optical disks; and Compact Disc Read-Only Memory (CD ROM) disks, Digital Versatile Disk-Read Only Memory (DVD-ROM) disks and solid state disks. The processor and the memory may be supplemented by, or incorporated in, special purpose logic circuitry.

To provide for interaction with a user, implementations may be realized on a computer having a display device, e.g., a CRT (cathode ray tube) or LCD (liquid crystal display) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any appropriate form of sensory feedback, e.g., visual feedback, auditory feedback, or tactile feedback; and input from the user may be received in any appropriate form, including acoustic, speech, or tactile input.

The term "device" is defined as an electronic element that cannot be divided without destroying its stated function.

The term "event" used herein refers to a planned public or social occasion.

The term "event planning" refers to the process of organizing and managing the public or social occasion.

The term "event venue" used herein refers to a place where the event is happening.

The term "room" used herein refers to a guest room, conference room, meeting room, and banquet room.

The term "service" used herein refers to a public need. Herein it refers to needs related to event planning and management.

The term "customer" as used herein refers to an individual looking to book an event, an automated machine, and a semi-automated machine.

The term "vendor" as used herein refers to a party in the business of event planning and management that makes goods and services available to the customer.

The term "server" is defined as a computer that manages network resources.

The term "communicatively coupled" is defined as devices connected in a way that permits communication.

The term "configured" is defined as arranged within the system to perform certain functions.

The term "receiving" is defined as being given information.

The term "generating" is defined as creating information.

The term "enquiry" refers to a query by a customer.

The term "recommendations" refers to the suggestions of the event venues, rooms, and services generated by the system by analysing the enquiry.

The term "real-time" relating to a system in which input data is processed within milliseconds so that it is available virtually immediately as feedback to the process from which it is coming.

The term "inventory" herein refers to a complete list of the event venues, rooms, and services.

The term booking herein refers to confirming and reserving the event venue and services.

The term "memory" is defined as any device in which information can be stored.

The term "execute" is defined as run or launch.

The term "instructions" is defined as a software program or machine executable code.

The term "processor" is defined as a component in the server for executing instructions stored in memory.

The term "budget" refers to an estimation of revenue and expenses over a specified event or service.

The term "beacon" is defined as small, wireless transmitters that use low-energy Bluetooth technology to send signals to other smart devices nearby.

Example embodiments, as described below, may be used to provide event planning and management. It will be appreciated that the various embodiments discussed herein need not necessarily belong to the same group of embodiments and may be grouped into various other embodiments not explicitly disclosed herein. In the following description, for purposes of explanation, numerous specific details are set forth in order to provide a thorough understanding of the various embodiments.

Implementations and all of the functional operations described in this specification may be realized in digital electronic circuitry, or in computer software, firmware, or hardware.

A software program (also known as a program, software, executable code, or instructions) may be written in any appropriate form of programming language, including compiled or interpreted languages, and it may be deployed in any appropriate form, including as a standalone program or as a module, component, subroutine, or other unit suitable for use in a computing environment.

While this specification contains many specifics, these should not be construed as limitations on the scope of the disclosure or of what may be claimed, but rather as descriptions of features specific to particular implementations. Certain features that are described in this specification in the context of separate implementations may also be implemented in combination in a single implementation. Conversely, various features that are described in the context of a single implementation may also be implemented in multiple implementations separately or in any suitable sub-combination. Moreover, although features may be described above as acting in certain combinations and even initially claimed as such, one or more features from a claimed combination may in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described should not be understood as requiring such separation in all implementations, and it should be understood that the described program components and systems may generally be integrated together in a single software product or packaged into multiple software products.

Even though particular combinations of features are recited in the claims and/or disclosed in the specification, these combinations are not intended to limit the disclosure of possible implementations. Other implementations are within the scope of the following claims. For example, the actions recited in the claims may be performed in a different order and still achieve desirable results. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

Further, the methods may be practiced by a computer system including one or more processors and computer-readable media such as computer memory. In particular, the computer memory may store computer-executable instructions that when executed by one or more processors cause various functions to be performed, such as the acts recited in the embodiments.

Generally, for an event to be successful requires efficient event planning and event management. The event may be a gathering of people, formal or informal. Event planning includes identifying a venue, selecting a caterer, coordinating with other vendors, last minute changes, and tracking budget. Currently systems and methods are available to plan an event. However, these systems lack real-time recommendations based on the customer behavior, requirements, and the tracking of budget. These systems provide booking of an event from a database of vendors.

In an aspect, the present disclosure discloses a system for event planning and management. An enquiry for one or more event venues, rooms, and services is received. After receiving the enquiry, details of the vendor are received from the database of vendors. Recommendations of one or more events and services are generated on the basis of the enquiry of the one or more event venues, rooms, and services. The recommendations are displayed. A selection of the event venues, rooms, and services is received. A booking is confirmed based on the selection of the one or more events and services.

FIG. 1 shows a network implementation of a system 102 for event management and planning, in accordance with an embodiment of the present subject matter may be described. In one example, the system 102 may be connected with a server 104 and user devices 108-1 through 108-N(collectively referred as 108) through a cloud network 106.

It should be understood that the system 102, server 104 and the user devices 108 correspond to computing devices. It may be understood that the server 104 may be a network server. The server 104 may comprise a web server, web application server and a server database. It may be understood that the system 102 may also be implemented in a variety of computing systems, such as a laptop computer, a desktop computer, a notebook, a workstation, a mainframe computer, a cloud-based computing environment, or a smartphone and the like. It may be understood that the user devices 108 may correspond to a variety of portable computing devices, such as a laptop computer, a desktop computer, a notebook, a smartphone, a tablet, a phablet, and the like.

The components of the system 102 may be interconnected by any appropriate form or medium of digital data communication, e.g., a communication network. Examples of communication networks include a local area network ("LAN") and a wide area network ("WAN"), e.g., the Internet.

Figure 2:
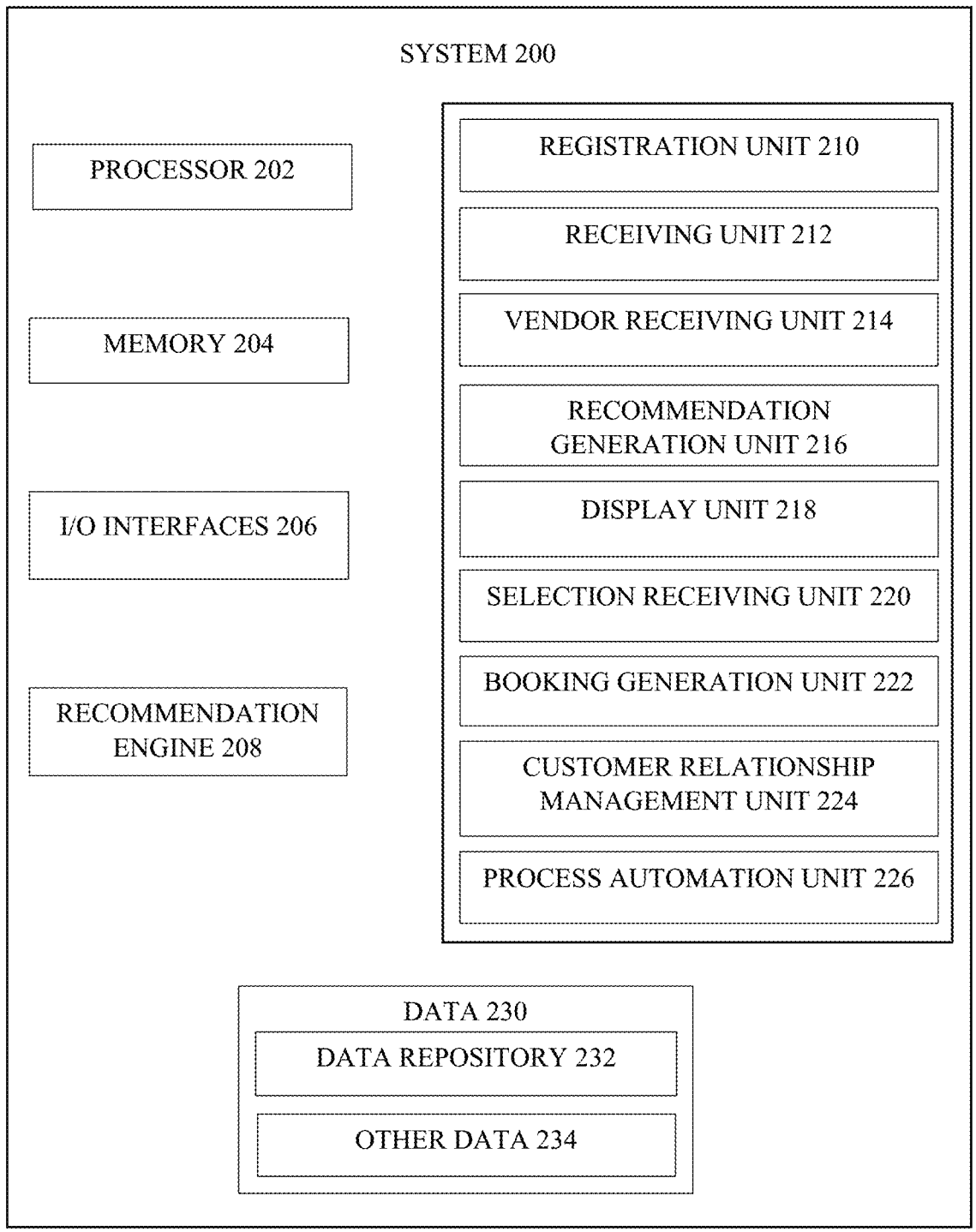
FIG. 2 illustrates a block diagram of the system for event planning and management, according to one or more embodiments.

FIG. 2 illustrates a block diagram of the system for event management and planning 200, according to one or more embodiments. The system 200 disclosed herein comprises a memory 204, a processor 202, input/output (I/O) interfaces 206 and a recommendation engine 208. The processor 202 is communicatively coupled to the memory 204, input/output (I/O) interfaces and the recommendation engine 208. The system 200 also comprises data 230. The processor 202 may take the form of a single core processor, multi-core processor (e.g., a dual core processor, triple core processor, quad core processor, etc.), microprocessor, etc. In some embodiments, the processor 202 may be external to an apparatus (e.g., server), for example the processor 202 may be a remote processor (e.g., a cloud-based processor). Alternatively, or additionally, the processor 202 may be internal and/or local to the apparatus. The recommendation engine 208 may utilize a statistical analysis, a machine learning algorithm, artificial intelligence, or a rule-based analysis technique to generate recommendations. The system 200 further comprises a registration unit 210, receiving unit 212, vendor receiving unit 214, recommendation generation unit 216, display unit 218, selection receiving unit 220, booking generation unit 222, customer relationship management (CRM) unit 224, and process automation unit 226.

The data 230 may include a repository 232 for storing data processed, computed, received, and generated by one or more of the units. Furthermore, the data 230 may include other data 234 for storing data generated as a result of the execution of modules other than the ones mentioned above.

The above-mentioned units in association with the processor 202 are configured to perform event planning and management.

The registration unit 210 receives details of a customer. The details of a customer may be at least one of a name, an identifier, a password, a contact address, a telephone number, and an email-id. The customer is an individual using the system for event planning and management and wants to book an event venue and services using the system 200. The details may be of a registered customer or a new customer. The registered customer is the customer who has already registered on the system by entering the details previously. A new customer is a customer whose details are received by the system 200 for the first time. The system 200 may save the details of the new customer for future use and allow receiving of details. After receiving the registration details the processor 202 enables the receiving unit 212 to receive enquiry from the customer through a user device 108.

The receiving unit 212 receives an enquiry for one or more event venues, rooms, and services from a user device 108. The user device 108 may be used by the customer. The enquiry received by the system 200 may be filled in the form of a search query in the user device 108. The search query comprises date of the event, time period of the event, location for the event, type of event, number of attendees, type of food and beverages preferred and a budget for the event and the like. The type of event may be weddings, receptions, birthdays, baby showers, office events, formal events, meetings, celebrations, and the like. The one or more event venues may comprise hotels, banquet halls, plots, gardens, dining halls, cruise boats and ships, heritage buildings and the like. The services may comprise caterers, disc jockeys, photographers, videographers, entertainers, musicians, singers, decorators, florists, and the like. The time period of the event is the time required to complete the whole event (e.g., the event may be of 3 hours or 4 hours.) The number of attendees is the approximate number of guests that are expected to attend the event. The type of food and beverages preferred may have a list of types of food and beverages from which the customer may select the type of food and beverage. The budget of the event is the approximate expenditure that a customer wants to spend on the event.

On receiving the enquiry, the vendor receiving unit 214 receives the details of a vendor from a database of vendors. The database of vendors may be stored in the data 230 of the system 200. The details of vendors may be a name, an identifier, a contact address, a telephone number, an email-id, and a database of event venues, rooms, and services. The vendor is a party in the business of event planning and management that makes goods and services available to the customer. Therefore, the vendors may offer the event venues and service for rent and may charge for the services. The vendor interested in offering the one or more event venues, rooms, and services may register themselves in the system 200 by entering their details in the system 200. The details of the vendor are stored in the database of vendors. After receiving the details of the vendor by the vendor receiving unit 214, the recommendation generation unit 216 generates recommendations of the one or more event venues, rooms, and services according to the enquiry by the customer.

The recommendation generation unit 216 may generate recommendations through the recommendation engine 208. The recommendation of one or more event venues, rooms, and services are generated by using predictive data analytics. The recommendation engine 208 may utilize at least one of a statistical analysis, a machine learning algorithm, artificial intelligence, or a rule-based analysis to generate the recommendations. For the predictive data analysis, the recommendation engine 208 tracks a customer behavior and a search pattern of the one or more customers. The behavior of the one or more customers may be the history of the customer's search query, preferences of event venues, locations, and types of services. The search pattern may be the date of the event, time period of the event, location for the event, type of event, number of attendees, type of food and beverages preferred and a budget for the event. The recommendation engine 208 performs predictive data analytics on the customers having similar search patterns. That is the search pattern of the one or more customers may be matching. The matching percentage may vary from 50.0% to 99.9%.

In an embodiment, the recommendation engine 208 operates in a collaborative filter mode. The collaborative filter mode collects information from search patterns and the behavior of one or more customers.

The display unit 218 displays the recommendations of the one or more event venues, rooms, and services that are generated by the recommendation engine 208. The recommendations of the one or more event venues, rooms, and services are displayed as a real-time inventory of the one or more event venues, rooms, and services on the user device 108. The real-time inventory of one or more event venues, rooms, and services comprises an inventory of event venues available, an inventory of rooms in the event venues, an inventory of one or more menus of food and beverages, an inventory of one or more customizable seating arrangements, and an inventory of one or more service vendors. The inventory of event venues may display the event venues that are available for the preferred date of event received in the enquiry. The event venues displayed may be in a selected distance around the location received in the enquiry. The inventory of rooms available in the event venues may be the available rooms on the date of event and the time of event received in the enquiry. The inventory of customized seating arrangements may have the seating arrangements that are possible and offered by the vendor of the event venues. The inventory of food and beverages may be menus of food and beverages available based on the type of food and beverages received in the enquiry. The inventory of services may be the services that are available for the date and time in the enquiry, that may be for the location in the enquiry.

For example, the processor 202 receives an enquiry for a birthday celebration as type of an event, on 1$^{st}$ September as date of an event, the time of an event is from 6 pm to 10 pm, location is within 10 miles of Washington, D.C., 50 attendees, Mexican food and soft drinks as the food and beverages and a budget of $1,000. The recommendation engine 208 generates the recommendations based on the enquiry. The recommendations of event venues for the budget of $1,000 and based on the predictive analysis, there may be 10 event venues displayed in the radius of 10 miles of Washington, D.C. There may be 5 big meeting rooms and 12 small meeting rooms available in total for the event venues displayed. The seating arrangement may be one big round table, multiple round tables, columns of chairs, both chairs and round tables, sofas. In Mexican food menu there may be a list of starters, main courses, and desserts. Soft drinks may display a variety of fruit-based drinks, juices, soda etc. The inventory of services may display the available videographers, bands, decorators, florists, and cake vendors for the location.

The selection receiving unit 220, receives a selection of the event venue and services. The selection of the event venues, rooms, and services may comprise selection of type of event venues, type of rooms, type of seating arrangements, the type of food and beverages and services. For example, the customer may select an event venue in Washington, D.C., say XYZ hotel, a big meeting room for 50 persons, a round table seating arrangement, a light menu having a cooked snack and cookies, soda as the beverage, photographer, and meeting setup arranger. The selection is done by the customer from the real-time inventory of event venues, rooms, and services displayed on the user device 108. The system 200 is a one stop consolidator that allows selection of one or more event venues, rooms, and services at a time. Upon receiving the selection of event venues, rooms, and services, the booking generation unit 222 generates a booking of the event by confirming the event venue, type of rooms, seating arrangements, type of food and beverages and other services.

In an embodiment, the booking generation unit 222 further generates a payment amount against the booking. The payment amount is the total cost of the event. The total cost of the event comprises the cost of the event venue and the meeting room for the date and time of the event, food and beverages and services booked for the event. The payment amount may be paid through online payment methods such as credit card, debit card, third party payment apps. The third-party payment apps are the applications that support online payment through various payment options. Once the payment is done by the customer, payment details are received by the booking generation unit 222 through the user device 108. On receiving the payment details, a booking order and contract is generated. In addition to the details of the booking, the contract may contain terms and conditions and other policies of the vendor. The booking order and contract is delivered electronically to the customer as well as the vendor. The booking order and contract may be delivered by email, private message, and push notification etc. on the user device 108. The system 200 may approve the booking order and contract on receipt of an electronically signed booking order and contract.

In an embodiment, the system 200 comprises a customer relationship management (CRM) unit 224. The customer relationship management (CRM) unit 224 is configured to enable visibility and easy accessibility of one or more customer accounts to the vendor. The customer relationship management (CRM) unit 224 provides a dashboard on the user device 108 that enables reviewing availability of the one or more event venues, rooms, and services. The vendor may easily analyze the bookings done for days, weeks and months. The vendor may interact with the system 200 through the dashboard on the user device 108. By analyzing the bookings, the vendor may be kept updated on the availability of the event venues, rooms, and services. All the bookings, upcoming events, date, and timings are easily visible on a dashboard on a user device 108.

In an embodiment, the system comprises a process automation unit 226. The process automation unit 226 is utilized to automate the booking of the event venue, rooms, and services. The process automation unit automates the repetitive booking generation. The process automation unit 226 automates the generation of an event order and a contract. In addition to the details of the booking, the contract may contain terms and conditions and other policies of the vendor. After the event order and contract is generated, the event order and contract is sent electronically to the customer as well as the vendor automatically. The process automation unit 226 automatically approves the event order and contract upon receipt of the electronic signature on the event order and contract. The process automation unit 226 utilizes robotic process automation to automate the repetitive booking generation. Robotic process automation (RPA) utilizes bots to automate the repetitive booking generation steps. The bots are first trained to do the repetitive booking generation. Bots may interact with any application or system. In the present system 200, the bots automatically fill in the forms and generate the event order and contract and deliver the event order and contract to the customer and vendor. The bots automatically approve the booking order and contract upon receipt of the electronically signed booking order and contract.

In an embodiment, the system 200 may be configured to conduct a post event survey and receive feedback from the customer. That is a customer may answer the survey by the system 200. The customer also might provide feedback and reviews of experience with the vendors. The system 200 may receive ratings of the one or more events and services. The customer might rate the event venues, rooms, and services on a numerical scale, for example 1 to 5 stars, one for the worst, and 5 for the best. Also, the system may perform a post event analysis, by comparing similar size and type of events in the same region and also collecting reviews/comments, of the one or more event venues, rooms, and services.

In an embodiment, the system 200 may be device independent. The system may be deployed on multiple platforms comprising a web portal and a mobile application.

Figure 4:
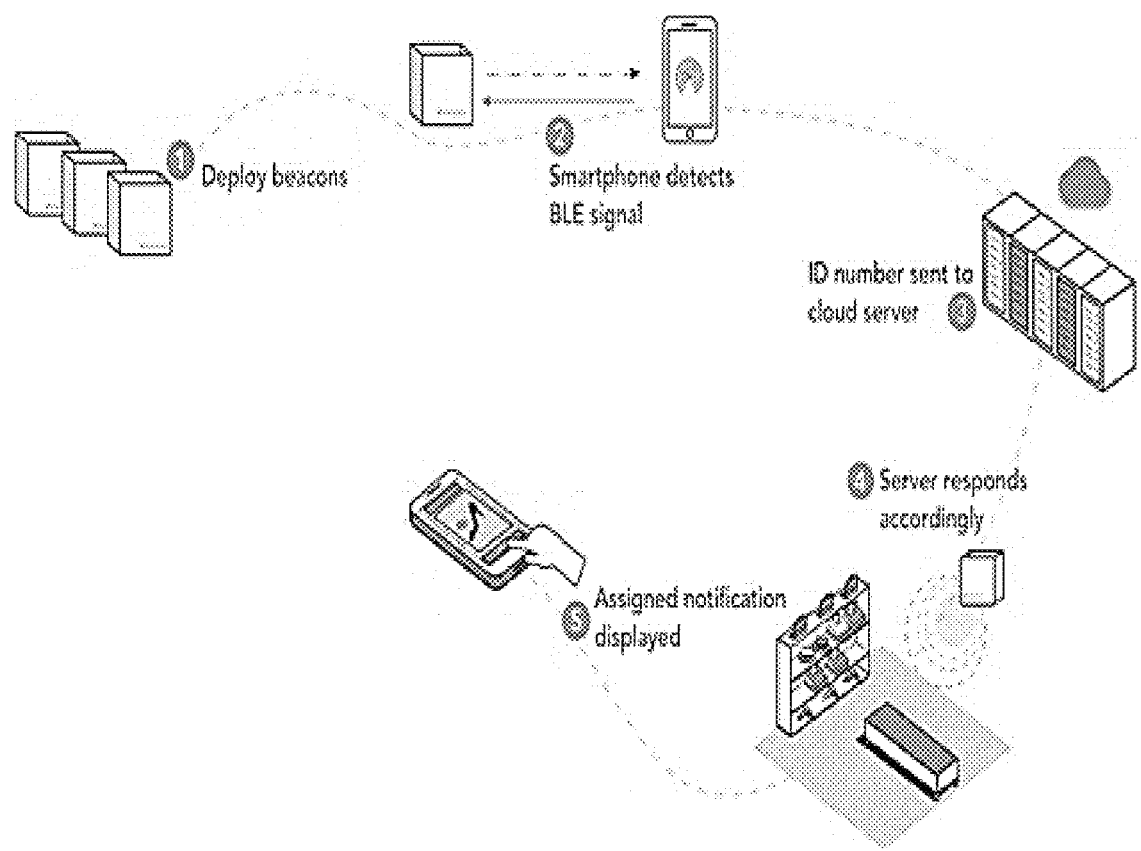
FIG. 4 illustrates a working flowchart of a beacon or IOT device, according to one or more embodiments.

In an embodiment, the system 200 may connect one or more beacons and/or Internet of Things (IOT) devices to one or more handheld devices. Beacons enable communication with one or more handheld devices, while the event is in progress. Beacons are small, wireless transmitters that use low-energy Bluetooth technology to send signals to other smart devices nearby. Beacons connect and transmit information to smart devices making location-based searching and interaction easier and more accurate. The beacons enable communication through relay messages and through push notifications. The beacon operates by repeatedly broadcasting out an identifier. This identifier is picked up by a handheld device. The identifier is a unique ID number that the handheld device recognizes as unique to the beacon. The handheld device then sends the ID number attached to the signal to a cloud server as shown in FIG. 4. The server responds with the action linked to the beacon ID that is relay messages and through push notifications.

For example, during an event there is a surprise announcement "let's gather outside in the lawn" to be made. The beacon repeatedly broadcasts out an identifier. This identifier is picked up by a handheld device, usually a mobile. The identifier is a unique ID number that the mobile recognizes as unique to the beacon. The mobile then sends the ID number attached to the signal to a cloud server as shown in FIG. 4. The server responds with the action linked to the beacon ID. Therefore, the notification announcement "let's gather outside in the lawn" is displayed on the screen of the mobile or other display devices as a push notification.

In an embodiment, the receiving unit 212 may receive a request for change in booking. A customer who has previously booked an event may request for change in booking. The request for change in booking may be in case of an emergency, change in event time, change in event date or the like. Upon receiving the request for change in booking, the registration unit 210 may receive the details of the customer. The vendor receiving unit 214 receives the details of the vendor available on the date and time of the event that was booked. The recommendation generation unit 216 may generate alternative recommendations of the event venues, rooms, and services through the recommendation engine 208. The alternative recommendations may be the event venues, rooms, and services available for the date and time other than the booking that was done previously. The display unit 218 displays the recommendations generated as the real-time inventory of the event venues, rooms, and services. The selection receiving unit 220 may receive a selection from the alternative recommendations. A change in booking is generated upon receipt of the selection of alternative recommendations by the booking generation unit 222.

The booking generation unit 222 further adjusts the payment amount from the previous booking of the event. The booking order and contract is generated for the change in booking. In addition to the details of the booking, the contract may contain terms and conditions and other policies of the vendor. The booking order and contract is delivered electronically to the customer as well as the vendor. The booking order and contract may be delivered by email, private message, and push notification, etc. on the user device 108. The system 200 may approve the booking order and contract on receipt of an electronically signed booking order and contract.

For example, a customer has booked an event for $1^{st}$ October, 5:00 PM for 1 hour in ABC hotel in New York city. Due to an emergency, the booking has to be changed to 8:00 PM. The request for change in booking may be received. The details of the customer may be received. The details of vendors available on $1^{st}$ October, 8:00 PM are received from the database of vendors. Alternative recommendations of one or more events and services may be generated. The alternative recommendations may have event venues, rooms, and services available in New York city, on $1^{st}$ October, 8:00 PM. The alternative recommendations may be displayed as the real-time inventory of rooms, seating arrangements, food and beverages and inventory of services enquired for $1^{st}$ October, 8:00 PM.

Figure 3:
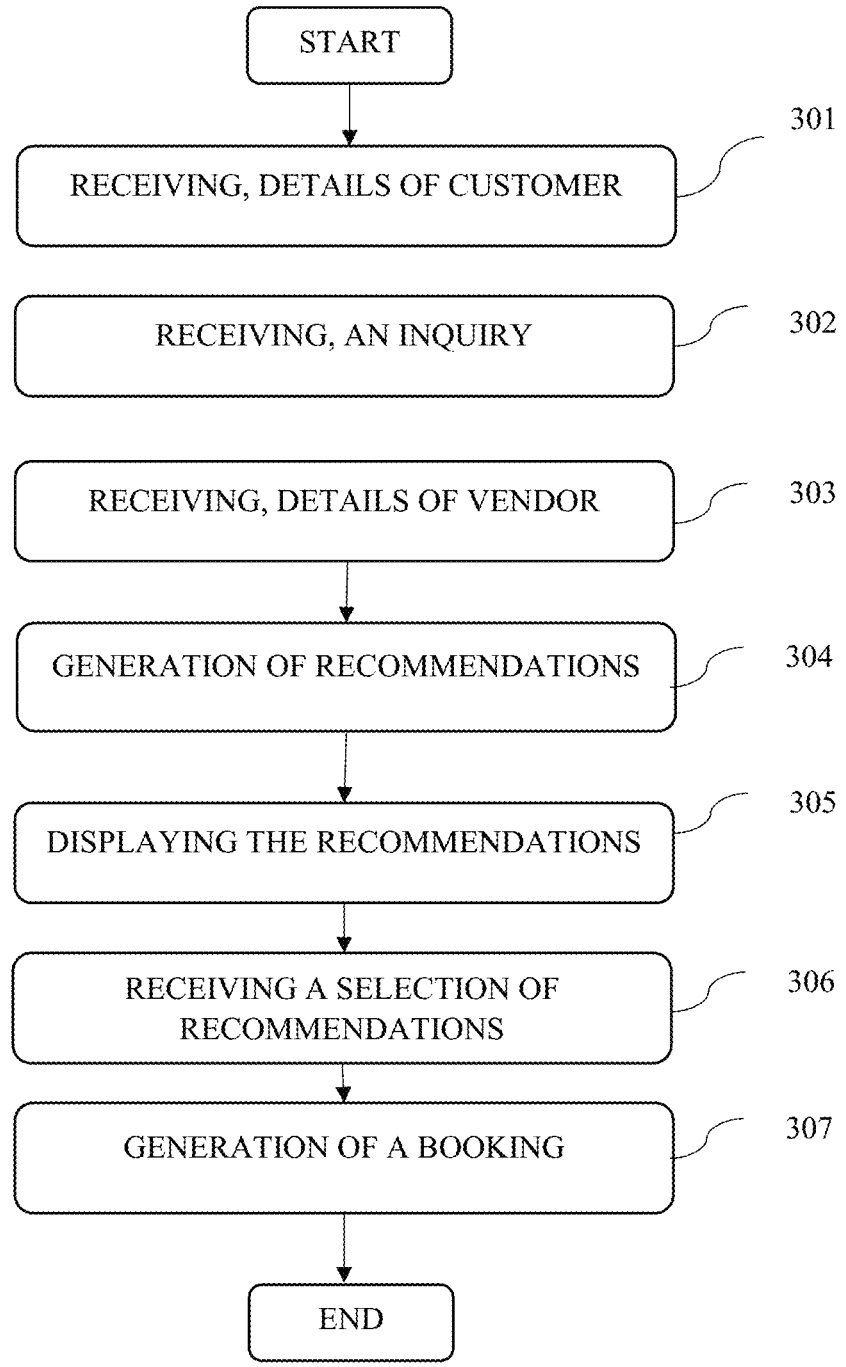
FIG. 3 illustrates a method for event planning and management, according to one or more embodiments.

FIG. 3 illustrates a method for event planning and management, according to one or more embodiments. At step 301, details of a customer are received. The details of a customer may be at least one of a name, an identifier, a password, a contact address, a telephone number, and an email-id. The details may be of a registered customer or a new customer. The registered customer is the customer who has already registered on the system by entering the details previously. A new customer is a customer whose details are received for the first time. The details of the customer may be saved in case of the new customer for future use.

At step 302, an enquiry for one or more event venues, rooms, and services is received. The enquiry received may be in the form of a search query. The search query comprises date of the event, time period of the event, location for the event, type of event, number of attendees, type of food and beverages preferred and a budget for the event and the like. The type of event may be weddings, receptions, birthdays, baby showers, office events, formal events, meetings, celebrations, and the like. The one or more event venues may comprise hotels, banquet halls, plots, gardens, dining halls, cruise boats and ships, heritage buildings and the like. The services may comprise caterers, disc jockeys, photographers, videographers, entertainers, musicians, singers, decorators, florists, and the like. The time period of the event is the time required to complete the whole event. The number of attendees is the approximate number of guests that are expected to attend the event. The type of food and beverages preferred may have a list of types of food and beverages displayed, from which the customer may select the type of food and beverage. The budget of the event is the approximate expenditure that a customer wants to spend on the event.

At step 303, the details of a vendor are received from a database of vendors. The details of vendors may be a name, an identifier, a contact address, a telephone number, an email-id, and a database of event venues, rooms, and services. The vendors may have already registered their details and the details of the vendors are stored in the database of vendors.

At step 304, recommendations for one or more events and services are generated. The recommendations are generated through at least one of a statistical analysis, a machine learning algorithm, artificial intelligence, or a rule-based analysis. A customer behavior and search pattern of one or more customers is tracked. The customer behavior may be the history of the customer's search query, preferences of event venues, locations, and types of services. The search pattern may be the date of the event, time period of the event, location for the event, type of event, number of attendees, type of food and beverages preferred and a budget for the event. A predictive data analysis is performed on the customer behavior and search pattern of the one or more customers. The recommendation of one or more event venues, rooms, and services are generated by using predictive data analytics. The predictive data analysis is performed on customers having similar search patterns. That is, the search pattern of the one or more customers may be matching. The matching percentage may vary from 50.0% to 99.9%.

At step 305, the recommendations of the one or more event venues, rooms, and services are displayed. The recommendations of the one or more event venues, rooms, and services are displayed as a real-time inventory of the one or more event venues, rooms, and services. The real-time inventory of one or more event venues, rooms, and services comprises an inventory of event venues available, an inventory of rooms in the event venues, an inventory of one or more menus of food and beverages, an inventory of one or more customizable seating arrangements, and an inventory of one or more service vendors. The inventory of event venues may display the event venues that are available for the preferred date of event received in the enquiry. The event venues displayed may be in a selected distance around the location received in the enquiry. The inventory of rooms available in the event venues may be the available rooms on the date of event and the time of event received in the enquiry, the inventory of customized seating arrangement may have the seating arrangements that are possible and offered by the vendor of the event venues, the inventory of food and beverages may be menus of food and beverages available based on the type of food and beverages received in the enquiry. The inventory of services may be the services that are available for the date and time in the enquiry, for the location in the enquiry.

At step 306, a selection of the one or more event venues, rooms, and services is received. The selection of the event venues, rooms, and services may comprise selection of type of event venues, type of rooms, type of seating arrangements, type of food and beverages and services. The selection is done by the customer from the real-time inventory of event venues, rooms, and services displayed.

At step 307, booking is generated based upon the selection received. In an embodiment, a payment amount against the booking is generated. The payment may be done by the customer by online payment methods, and a detail of the payment done may be received. On receiving the payment details, a booking order and contract is generated. In addition to the details of the booking, the contract may contain terms and conditions and other policies of the vendor. The booking order and contract is delivered electronically to the customer as well as the vendor. The booking order and contract may be delivered by email, private message, and push notification etc. The booking is approved on receipt of the electronically signed booking order and contract. This step utilizes robotic process automation to automate the steps of generating a booking; that is generating payment amount, generating the booking order and contract, delivering the booking order and contract, and approving the booking order and contract.

In an embodiment, the method utilizes customer relationship management unit for enabling visibility and easy accessibility of one or more customer accounts to the vendors. The customer relationship management unit enables reviewing availability of the event venues, rooms, and services. Analysis of the bookings may be done by the vendors. The analysis of the booking may be done monthly, weekly, or daily. By analyzing the bookings, vendors may be kept updated on the availability of the event venues, rooms, and services. All the bookings, upcoming events, date, and timings are easily visible on a dashboard through a Customer Relationship Management (CRM) unit.

In an embodiment the method comprises connecting one or more beacons and/or IOT devices to one or more handheld devices, while the event is in progress. Communication is enabled between the beacon and the handheld device. An identifier (ID) is repeatedly broadcasted by the beacon. This identifier is picked up by a handheld device, usually a mobile. The identifier is a unique number that the mobile recognizes as unique to the beacon. The mobile then sends the ID number attached to the signal to a cloud server. The ID number attached to the signal is sent to the cloud server as shown in FIG. 4. The response from the server is the action to be taken and displayed on the handheld device. The beacons enable communication through relay messages and through push notifications.

In an embodiment a request for change in booking may be received. The request for change in booking may be in case of an emergency, change in event time, change in event date or the like. Upon receiving the request for change in booking, the details of a customer are received. The customer who has previously booked an event may request for change in booking. For the request for change in booking, the details of vendors are received from the database of vendors. Further, alternative recommendations are generated for one or more event venues, rooms, and services. The alternative recommendations may be the event venues, rooms, and services available for the date and time other than the booking that was done previously. The alternative recommendations are displayed as the real-time inventory of the one or more event venues, rooms, and services. A selection of the one or more event venues, rooms, and services are received. A change in booking is generated upon receipt of the selection of alternative recommendations.

The payment amount is adjusted from the previous booking of the event. The booking order and contract is generated for the change in booking. In addition to the details of the booking, the contract may contain terms and conditions and other policies of the vendor. The booking order and contract is delivered electronically to the customer as well as the vendor. The booking order and contract may be delivered by email, private message, and push notification etc. The booking order and contract may be approved on receipt of an electronically signed booking order and contract.

FIG. 4 shows the working flowchart of a beacon or IOT device. Beacons enable communication with one or more handheld devices, while the event is in progress. Beacons are small, wireless transmitters that use low-energy Bluetooth technology to send signals to other smart devices nearby. Beacons connect and transmit information to smart devices making location-based searching and interaction easier and more accurate. In step 1, the beacon operates by repeatedly broadcasting out an identifier. In step 2, this identifier is picked up by the handheld device. The identifier is a unique ID number that the handheld recognizes as unique to the beacon. In step 3, the mobile then sends the ID number attached to the signal to a cloud server. In step 4, the server responds with the action linked to the beacon ID. In step 5, the action is shown as a push notification or relay message on the handheld device.

Figure 5:
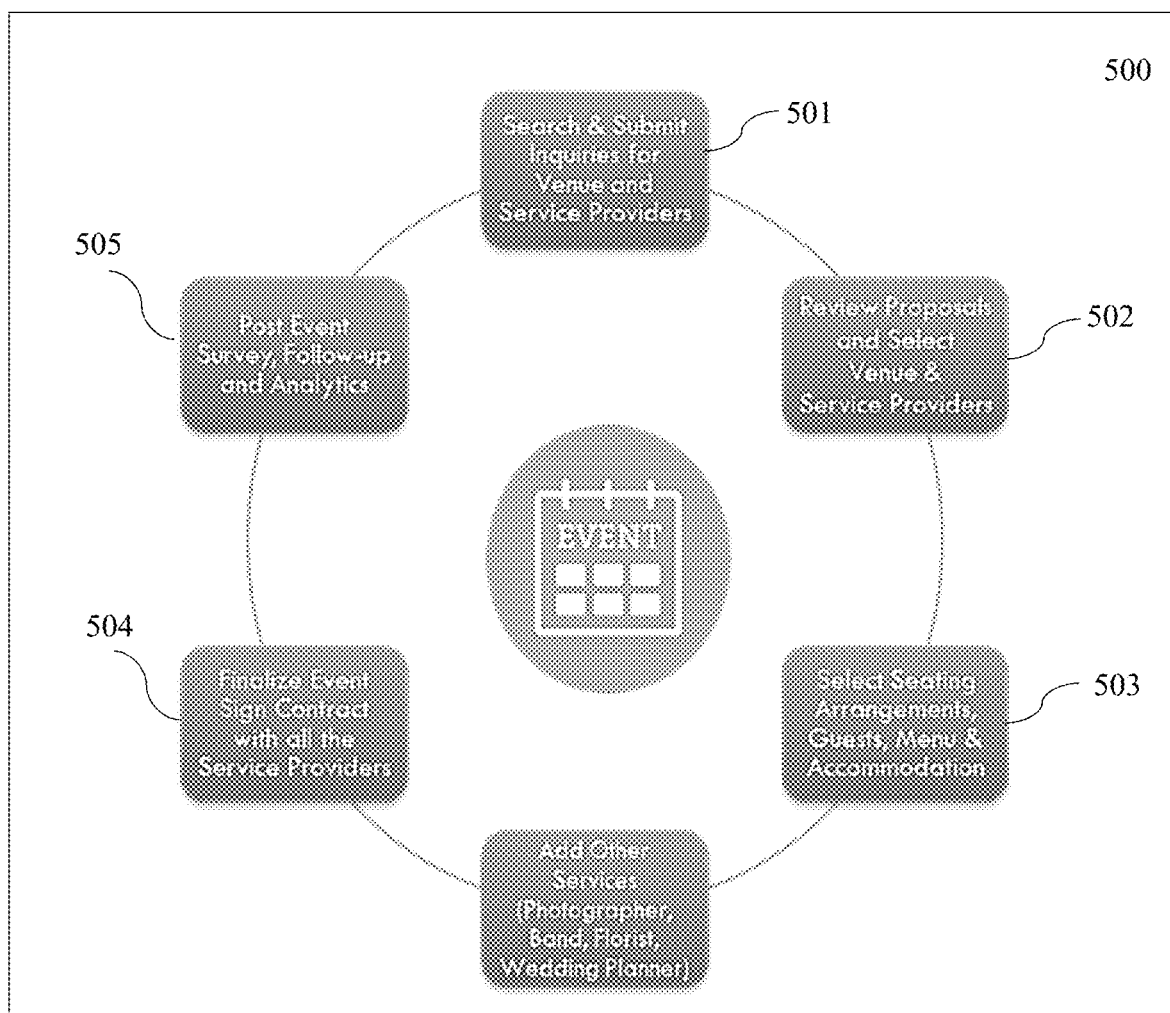
FIG. 5 illustrates a block diagram for event planning and management, according to one or more embodiments.

FIG. 5 illustrates a block diagram of an example embodiment of the system 500 for event planning and management. At block 501, the customer may enquire in the system 500 through a user device to search for event venues, rooms, and services by putting a search query. This enquiry is received by the system 500. The system 500 may generate recommendations of one or more event venues, rooms, and services through the recommendation engine 208, based on the search query of the customer. The recommendations of one or more event venues, rooms, and services may be displayed as a real-time inventory on the user device.

At block 502, the customer may review the recommendation of one or more events and services displayed and select the one or more event venues, rooms, and services that they desire to book. At block 502, the customer may select the type of seating arrangement, number of guests, menu of food and beverages and type of accommodation. At block 503, the customer may also select other services (e.g., florists, wedding planner, photographer, music band). The selection of the event venue and services may be received by system 500. The booking of the event may be generated on confirmation of the event venues, rooms, and services. The payment may be done by the customer. On receiving the payment details, booking order and contract may be generated and delivered electronically to the one or more customers and one or more vendors. In addition to the details of the booking, the contract may contain terms and conditions and other policies of the vendor.

At block 504, the one or more customers and the one or more vendors may sign the booking order and contract electronically. The system 500 may receive the electronically signed contract and finalize the booking of the event.

At block 505, the system may ask the customer for a post event survey and ratings of the one or more events and services. Also, the system 500 may perform a post event analysis of the one or more event venues, rooms, and services.

Figure 6:
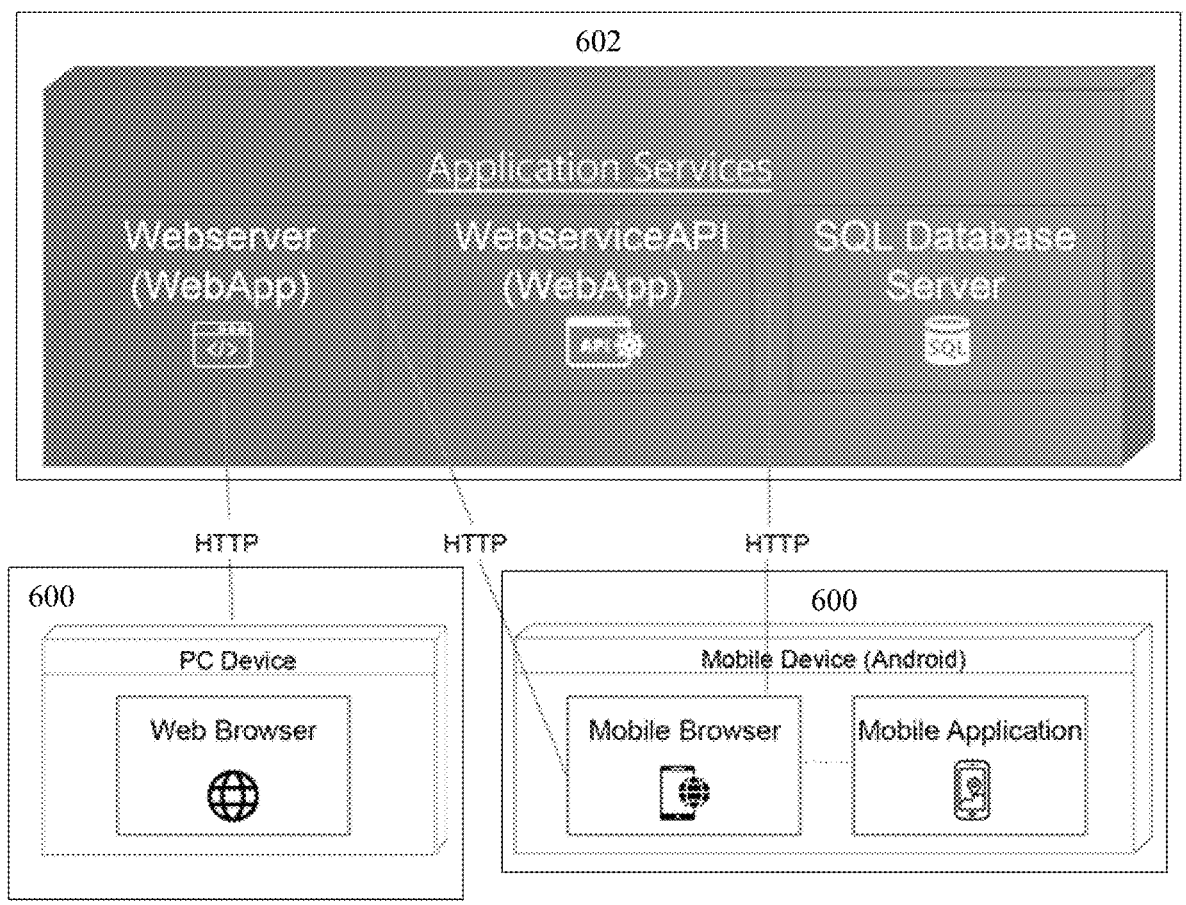
FIG. 6 illustrates an implementation of the system on multiple platforms, according to one or more embodiments.

FIG. 6, illustrates an implementation of the system 600 on multiple platforms according to one or more embodiments. The system 600 is device independent. The system may be deployed on multiple platforms comprising a web portal and a mobile application. The system 600 may be connected to a central server 602. The central server 602 may comprise a web server, an Application Programming Interface (API) and a database. The web-based browsers on the computers, tablets and mobile devices may connect to the web server. Applications on the computers, tablets and mobile devices may connect to the API. The central server database may store the data of the one or more customers, the one or more vendors of the one or more events, rooms, and services.

Figure 7:
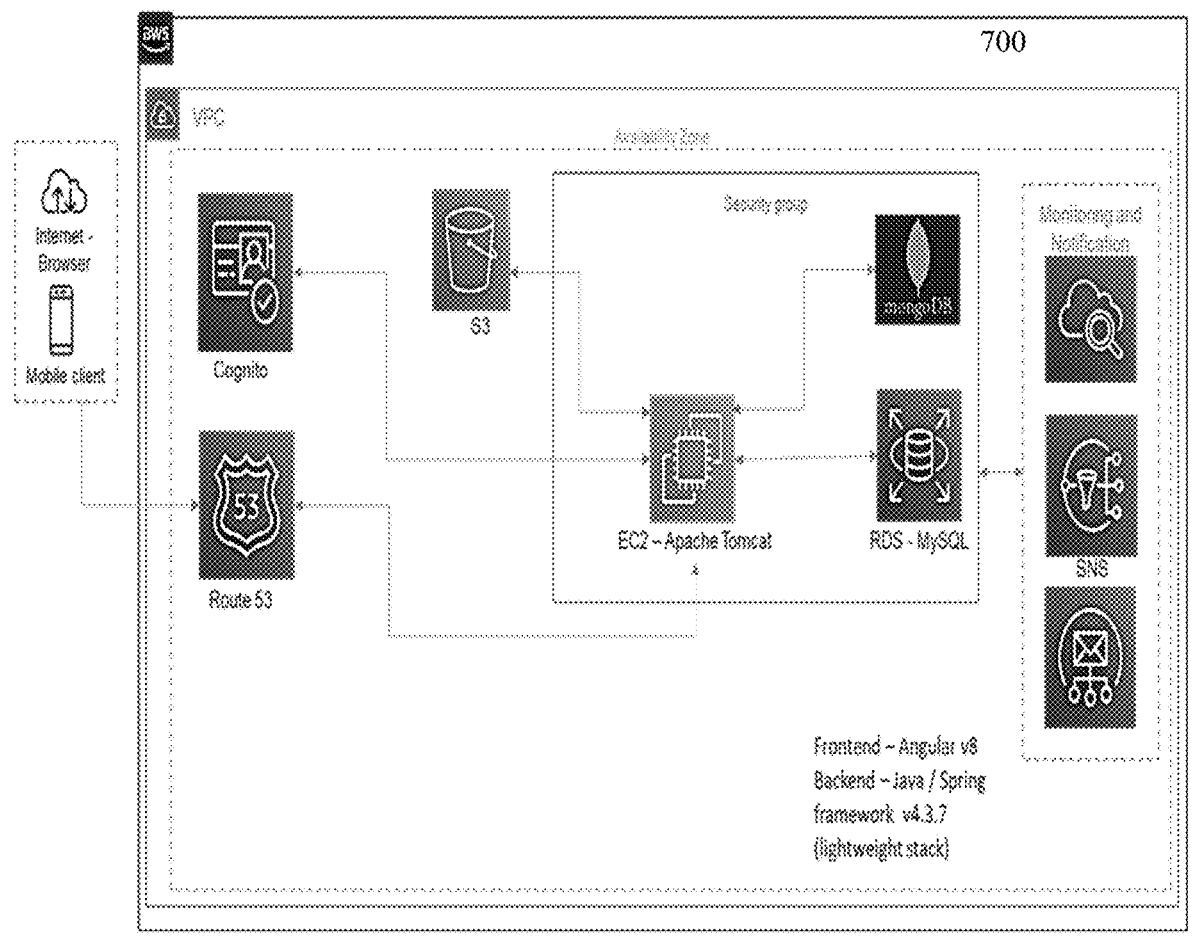
FIG. 7 illustrates a block diagram for the development of the system for event planning and management, according to one or more embodiments.

FIG. 7 illustrates an example embodiment of the system architecture of the system for event planning and management. The system 700 receives a login information of the customer. In an example of an embodiment, the system 700 utilizes identification verification services e.g., COGNITO to authenticate, authorize and manage the customers. Identification verification services e.g., COGNITO is utilized to protect the system 700 from hacking and any unauthorized access. Identification verification services e.g., COGNITO first checks a list of registered customers to verify the identity of the customer and then grants the access. Once the access is granted, identification verification services e.g., COGNITO further collects the customer credentials to monitor what components of the system the customer is allowed to use and what information the customer can view, edit, or delete. After the customer access is verified and authenticated, the system 700 utilizes domain name service e.g., Route 53 service to connect the customer to various other services such as retrieving information from the database or connecting to a cloud computing virtual machine service e.g., to perform search of the matching hotel or meeting room or other service providers. The system 700 utilizes a distributed relational database service e.g., RDS-MySQL for the setup, operation, and scaling of relational databases. The system utilizes the distributed relational database service e.g., RDS-MySQL to store all the hotels' detailed information including room details, amenities, food menu and services provided by various vendors i.e., service providers.

FIG. 8 illustrates an image of a search window in an exemplary embodiment of the system for event planning and management, according to one or more embodiments. In an example embodiment, the search window for the system comprises criteria: event type, location, date of the event, duration of the event, distance from the location, and number of guests. The customer willing to book an event may enter criteria through the search window in the system to get recommendation of the one or more event venues, rooms, and services. The recommendations generated by the system are based upon the criteria entered by the customer through the search window.

Figure 9:
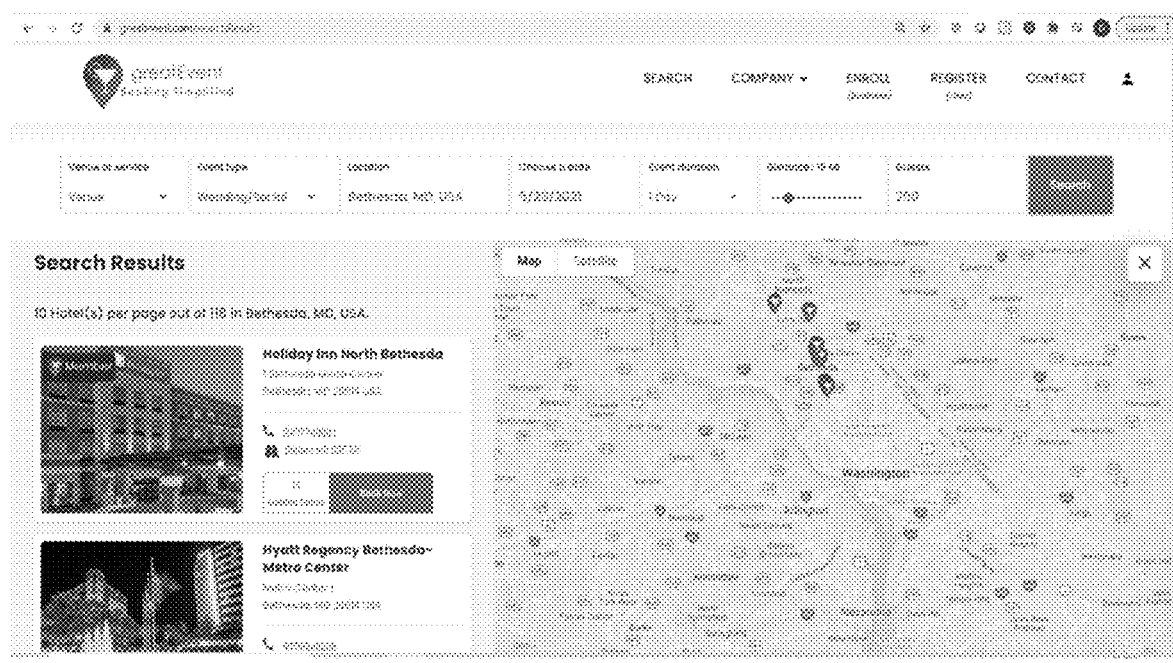
FIG. 9 illustrates an image of the recommendations displayed on the user device for event planning and management, according to one or more embodiments.

FIG. 9 illustrates an image of the recommendations displayed on the user device in an example embodiment of the system for event planning and management, according to one or more embodiments. In an example embodiment the recommendations of the event venues, rooms, and services may look as shown in FIG. 9. The recommendations display may have the name of the event venues, rooms, and services vendors, their contact details, address, email id and the like. The details of the vendor may help the customer to directly contact the vendor of the event venue and services, if needed. The recommendations of the one or more event venues, rooms, and services may be displayed in a pictorial form on a map. One can easily navigate through the map to look at the location and distance of the venue and then decide on which event venue to select.

Figure 10:
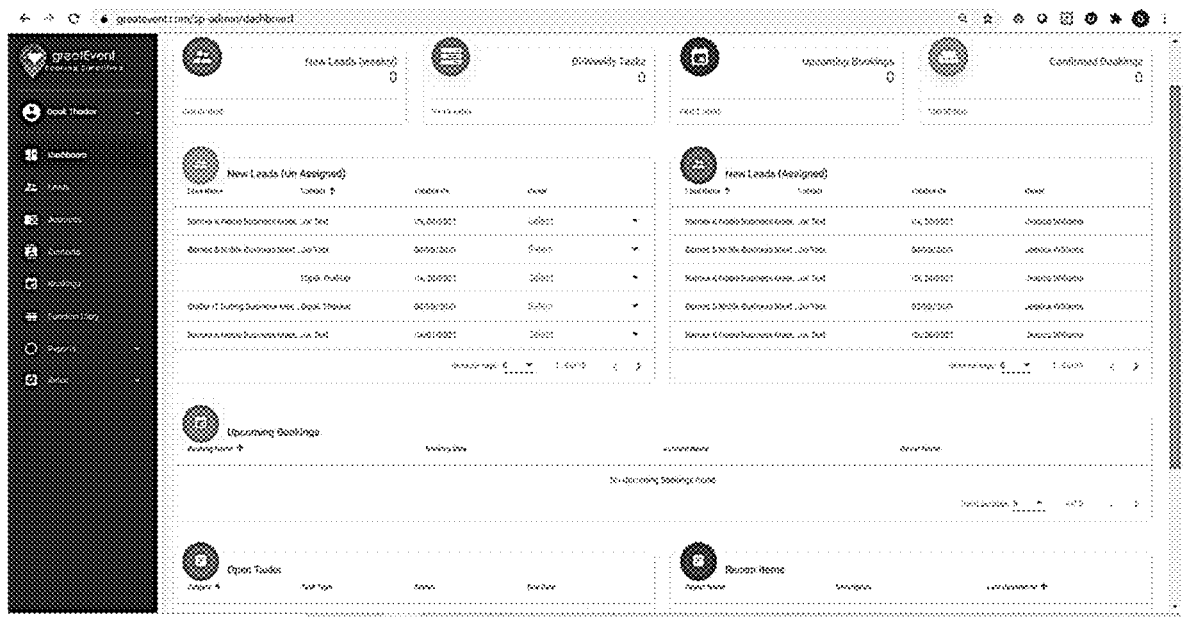
FIG. 10 illustrates an image of a dashboard for providing an overview of all activities relating to all events, for event planning and management, according to one or more embodiments.

FIG. 10 illustrates an image of a dashboard for providing overview of all activities relating to all events in an exemplary embodiment of the system for event planning and management. The dashboard enables visibility and easy accessibility of one or more customer accounts to the vendor through a Customer Relationship Management (CRM) unit. The dashboard provides reviewing availability of the one or more event venues, rooms, and services easily to the vendor. The vendor may easily analyze the bookings done for days, weeks and months. By analyzing the bookings, vendors may be kept updated on the availability of the event venues, rooms, and services. All the bookings, upcoming events, date, and timings are easily visible on a dashboard on a user device 108.

Figure 11:
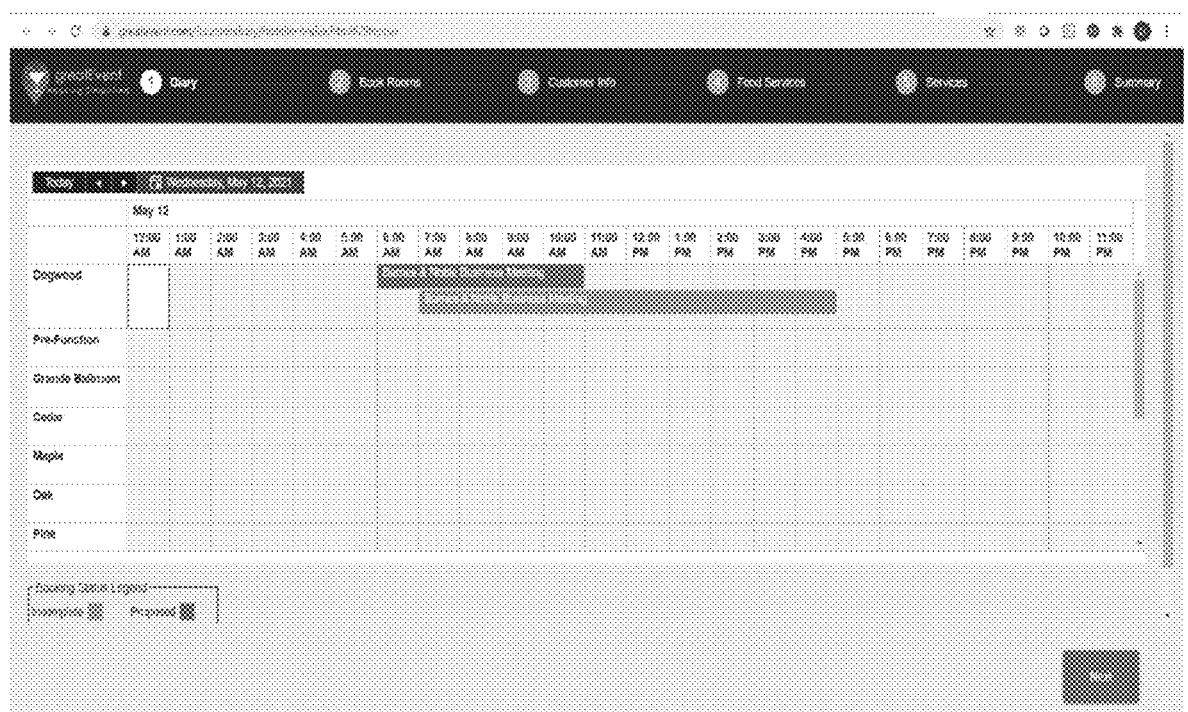
FIG. 11 shows the image of the calendar view that shows the live status of the rooms for event planning and management, according to one or more embodiments.

FIG. 11 shows the image of the calendar view of the rooms in an embodiment of the system for event planning and management. The rooms booked for date and time can be viewed in the calendar view. The calendar view provides an easy interface to view which meeting room is booked for what time on a particular date. This makes it easy for the vendor to stay updated and prepare for the event accordingly.

Figure 12:
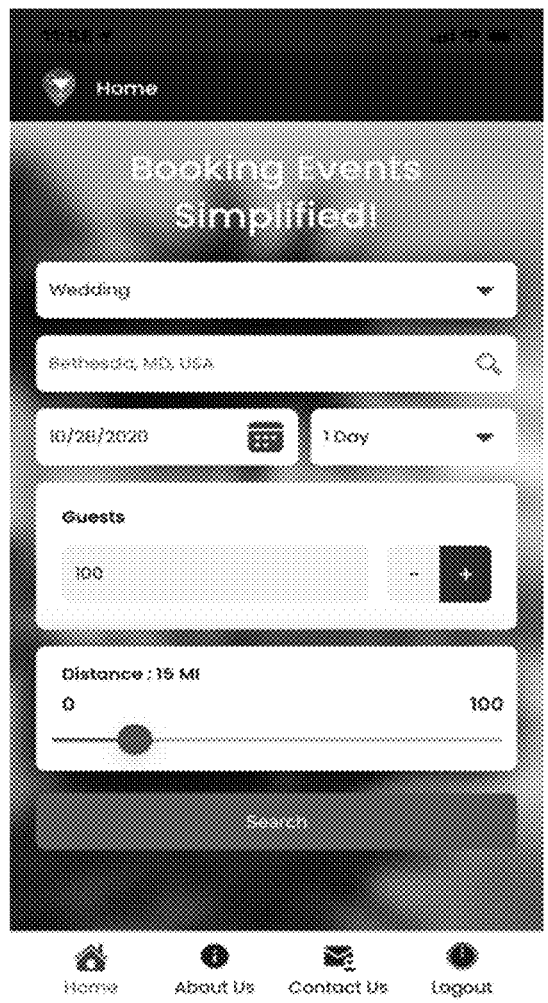
FIG. 12 shows the screenshot of a search window of the system implementation on a mobile application for event planning and management, according to one or more embodiments.

FIG. 12 shows the screenshot of a search window of the system implementation on a mobile application in an embodiment of the system for event planning and management. The system may be implemented on a mobile application. The system may receive enquiries from the customer through the search window of the mobile device. The search window for the system comprises the criteria: event type, location, date of the event, duration of the event, distance from the location, and number of guests. The customer willing to book an event may enter criteria through the search window in the system to get recommendation of the one or more event venues, rooms, and services. The recommendations generated by the system are based upon the criteria entered by the customer through the search window.

Figure 13:
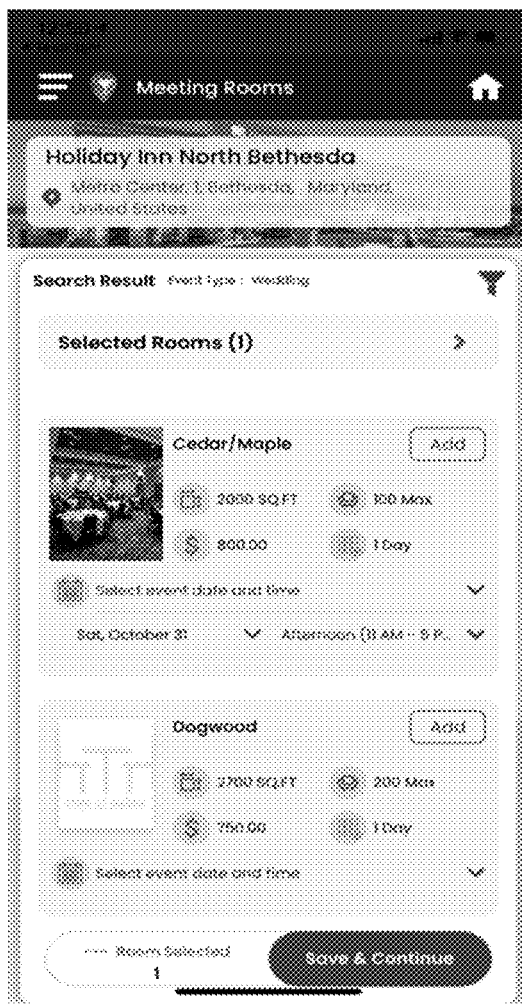
FIG. 13 shows the screenshot of a real-time inventory of recommendations displayed in the system implementation on a mobile application, according to one or more embodiments.

FIG. 13 shows the screenshot of a real-time inventory of recommendations displayed in the system implementation on a mobile application, according to one or more embodiments. The recommendations display may have the name of the event venues, rooms, and services vendors, their contact details, address, email id, and the like. The recommendations are displayed in a user-friendly view. The details of the vendor may help the customer to directly contact the vendor of the event venue, rooms, and services, if needed. The recommendations of the one or more event venues, rooms, and services may be displayed in a pictorial form on a map. One can easily navigate through the map to look at the location and distance of the venue and then decide on which event venue to select.

Figure 14A:
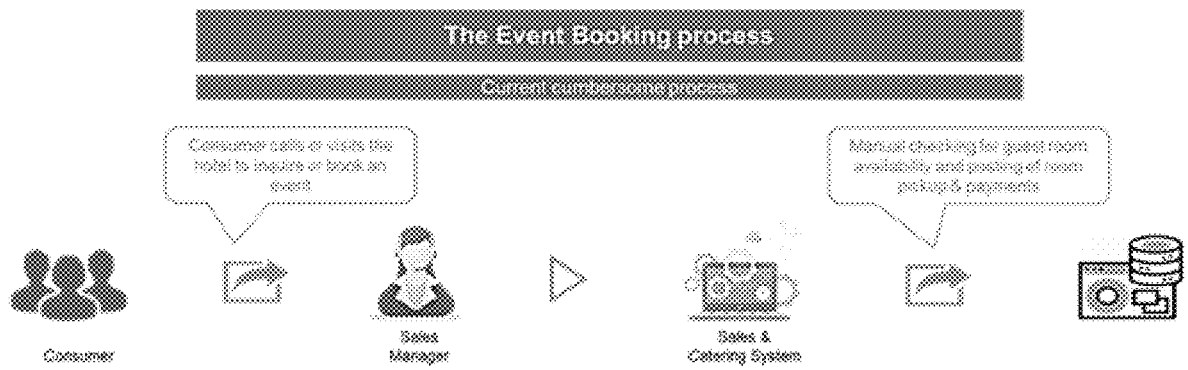
FIG. 14A shows a conventional system integrated to a Property Management System (PMS).

FIG. 14A shows an exemplary embodiment of a conventional system integrated to a Property Management System (PMS). Conventional methods of event booking and management are tiresome, much of the method has repeated manual entry and lot of duplication of the data.

Figure 14B:
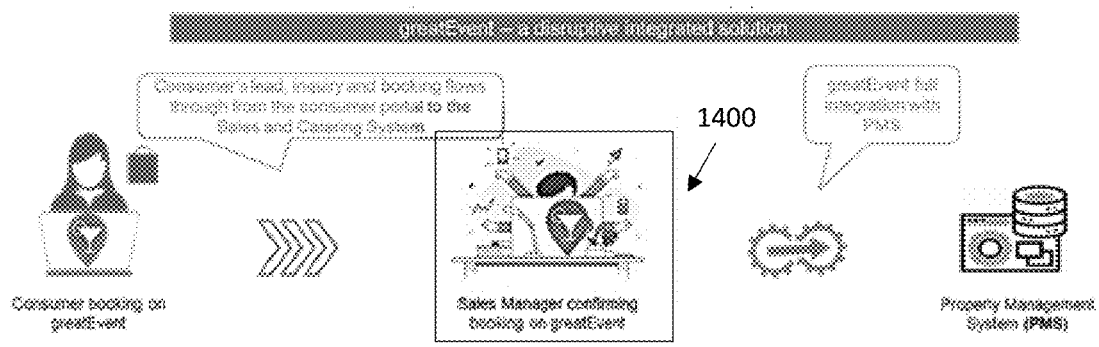
FIG. 14B shows the system integrated to a Property Management System (PMS), according to one or more embodiments.

FIG. 14B shows an exemplary embodiment of the system integrated to a property management System (PMS), according to one or more embodiments. In an example embodiment, the system for event planning and management 1400 may be directly integrated with a Property Management System (PMS). A property management system facilitates booking of an event venue, room, or service. It manages the payments, and the room availability according to the booking done. The inventory of the event venues, rooms, and services may be managed by the Property Management System (PMS).

Figure 15A:
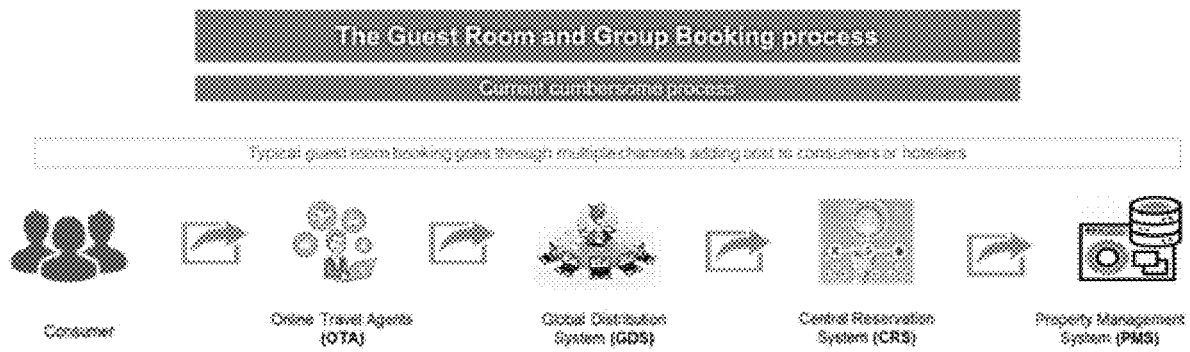
FIG. 15A shows a conventional system allowing booking of a room or only a service individually.

FIG. 15A shows an exemplary embodiment of a conventional system allowing booking of a room or only a service individually. Conventional systems for booking event venue and services requires various intermediaries, such as Online Travel Agents (OTA)—e.g., Expedia, Bookings etc., Global Distribution System (GDS)—e.g., Sabre, Galileo etc., and a Central Reservation System (CRS). These intermediaries increase costs by about 10% to 35%, which is passed to customers and vendors.

Figure 15B:
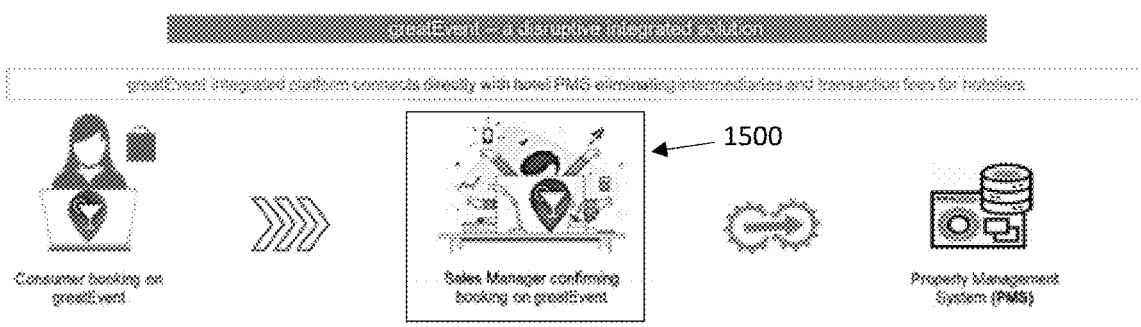
FIG. 15B shows the system allowing booking of a room or only a service individually, according to one or more embodiments.

FIG. 15B shows an exemplary embodiment of the system allowing booking of a room or only a service individually. The system 1500 facilitates direct booking of event venues, rooms, and services without the intervention of the intermediaries. In case a customer wants to book a room independent of an event, the system 1500 facilitates booking of the room without the booking of the event. In case a customer needs to avail a service, not an event, the system 1500 may allow booking of the service. Example, the customer enquires about a single occupancy room for 3 days from $31^{st}$ July in New York city, the system 1500 generates recommendations of available rooms for 3 days from $31^{st}$ July in New York city. The customer may provide a selection of the room of choice and the booking for a single room may be generated for 3 days from $31^{st}$ July.

Foregoing disclosure provides illustration and description but is not intended to be exhaustive or to limit the implementations to the precise form disclosed. Modifications and variations are possible in light of the above disclosure or may be acquired from practice of the implementations.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, etc. The invention may also be practiced in a distributed system environment where local and remote computer systems, which are linked (either by hardwired data links, wireless data links, or by a combination of hardwired and wireless data links) through a network, both perform tasks. In a distributed system environment, program modules, units, may be located in both local and remote memory storage devices.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

Although the present embodiments have been described with reference to specific example embodiments, it will be evident that various modifications and changes may be made to these embodiments without departing from the broader spirit and scope of the various embodiments. For example, the various devices, units, and modules described herein may be enabled and operated using hardware circuitry (e.g., Complementary Metal Oxide Semiconductor (CMOS) based logic circuitry), firmware, software or any combination of hardware, firmware, and software (e.g., embodied in a non-transitory machine-readable medium). For example, the various electrical structures and methods may be embodied using transistors, logic gates, and electrical circuits (e.g., Application Specific Integrated Circuit (ASIC) and/or Digital Signal Processor (DSP) circuit).

In addition, it will be appreciated that the various operations, processes, and methods disclosed herein may be embodied in a non-transitory machine-readable medium and/or a system. Accordingly, the specification and drawings are to be regarded in an illustrative rather than a restrictive sense.

INCORPORATION BY REFERENCE

All publications, patents, and patent applications cited in this specification are hereby incorporated by reference in their entirety, including:
US20190095882A1 published as "Multi-level network-based access coordination"
U.S. Pat. No. 7,685,025B2 published as "Web-based integrated event planning and management system and method"
WO2014/210162A1 published as "System and Method for On-Line Event Promotion and Group Planning"
US20200167699A1 published as "Event management and co-ordination platform"
US20180011859A1 published as "Database and system for venue collaboration"

What is claimed is:

1. A method in a data processing system comprising a processor and a memory, wherein the memory stores instructions for configuring the processor to implement an artificial intelligence-based recommendation engine and predictive data analytics executed by the data processing system for planning and management of an event, the method comprising:
   performing, by the artificial intelligence-based recommendation engine, analytics using predictive data analytics to identify a pattern in data, wherein the data comprises a search pattern and a customer behavior that is stored in a database, wherein the search pattern comprises at least one of a date of the event, a time period of the event, a location of the event, a type of the event, number of attendees, a type of food and a beverage, and a budget for the event,
   wherein the customer behavior comprises at least one of a history of the search pattern, a preference of at least one or more of venues, rooms, and services, an event location, an interest, a rating, a feedback, and a post-event survey from at least one of a guest and a customer;

generating, by the artificial intelligence-based recommendation engine, a recommendation using a combination of the search pattern, the customer behavior, and an interaction, wherein the recommendation comprises the one or more of the venues, the rooms, and the services that are available and within the budget based on a search query by a new customer that are most likely to be selected and relevant to the new customer;

displaying, on a user interface, the recommendation along with a location;

providing, an option to the customer, for customizing at least one of a seating arrangement at a selected venue, a food menu, an audio service, and a visual service;

generating a booking, via a contract signed electronically, of the one or more of the venues, the rooms, and the services based on a selection received, wherein the method utilizes Robotic Process Automation to fill in repetitive information utilizing one or more bots, wherein the one or more bots are first trained to do a repetitive booking generation;

connecting, after completion of the booking, at least a beacon to a handheld device during the event, thereby enabling communication between the beacon and the handheld device, wherein the beacon repeatedly broadcasts out an identifier and the identifier is picked up by the handheld device; and wherein the artificial intelligence-based recommendation engine comprising a collaborative filtering is trained on the data stored in the database and continually learns and adjusts a classifier as new data becomes available; and wherein the method is configured to book the one or more of the venues, the rooms, and the services and is deployed on a cloud-native platform that is configured to connect directly with a Property Management System to enable real-time visibility into an inventory of the one or more of the venues, the rooms, and the services.

2. The method of claim 1, wherein the method further comprises verification of identity before granting access to the data processing system.

3. The method of claim 2, wherein identifying the search pattern of the customer is through a collaborative filter.

4. The method of claim 3, wherein the method further comprises:
keeping a track of the budget of the customer for the selection of the one or more of the venues, the rooms, and the services.

5. The method of claim 1, wherein the method further comprises displaying the inventory of the one or more of the venues, the rooms, and the services comprising, displaying, on a user device, a first inventory of one or more of the venues, a second inventory of the rooms, a third inventory of the type of food and the beverage, a fourth inventory of one or more customizable seating arrangements, and a fifth inventory of the services from a vendor.

6. The method of claim 1, wherein the booking further comprises, generating a payment amount by the data processing system;
receiving, by the data processing system, a detail of an online payment amount; generating, by the data processing system, an order, and the contract for the booking; delivering, by the data processing system, the order, and the contract to the customer and to a vendor electronically; and approving, by the data processing system, the order, and the contract by receiving an electronic signature on the order and the contract of the event.

7. The method of claim 1, wherein the inventory of the one or more of the venues, the rooms, and the services is accessed by a direct integration with the Property Management System.

8. The method of claim 1, wherein the method further comprises, enabling visibility and accessibility of account of the customer through an inbuilt Customer Relationship Management unit of the data processing system to a vendor for reviewing the booking of the one or more of the venues, the rooms, and the services; and wherein the inbuilt Customer Relationship Management unit enables analysis of an availability for the one or more of the venues, the rooms, and the services.

9. The method of claim 1, wherein the communication comprises a relay message and a push notification.

10. The method of claim 1, wherein the method is operable for generating a change in the booking based on a request from the customer for the change.

11. The method of claim 10, wherein the method further comprises:
adjusting a payment amount according to the change in the booking;
generating an order and the contract for the change in the booking;
delivering the order and the contract to the customer and to a vendor electronically; and
approving the order and the contract by receiving an electronic signature on the order and the contract of the event.

12. A system, comprising:
an integrated platform for planning and management of an event, comprising,
a graphical user interface integrated with a booking engine via a first application programming interface layer, wherein details of the event are provided and a recommendation for one or more of venues, rooms, and services is generated;
a booking system, wherein the booking system is integrated with the booking engine via a second application programming interface layer directly with a Property Management System and via a third application programming interface layer directly with a service information system of a service provider; and
a distributed relational database to store an inventory of the one or more of the venues, the rooms, and the services from the Property Management System and the service provider;
wherein the system is configured to generate the recommendation automatically for the one or more of the venues, the rooms, and the services based on a search for the event by,
performing, by an artificial intelligence-based recommendation engine, analytics using predictive data analytics to Identify a pattern in data, wherein the data comprises a search pattern and a customer behavior that is stored in a database, wherein the search pattern comprises at least one of a date of the event, a time period of the event, a location for the event, a type of event, number of attendees, a type of food and a beverage, and a budget for the event, wherein the customer behavior comprises at least one of a history of search pattern, a preference of at least one of the venues, the rooms, and the services, an event location, an interest, a rating, a feedback, and a post-event survey from at least one of a guest and a customer;

generating, by the artificial intelligence-based recommendation engine, the recommendation using a combination of the search pattern, the customer behavior, and an interaction, wherein the recommendation comprises of the one or more of the venues, the rooms, and the services that are available and within the budget based on a search query by a new customer that are most likely to be selected and relevant to the new customer;

displaying, on a user interface, the recommendation along with a location;

providing, an option to the customer, for customizing at least one of a seating arrangement at a selected venue, a food menu, an audio service, and a visual service;

generating a booking, via a contract signed electronically, of the one or more of the venues, the rooms, and the services based on a selection received, wherein the system utilizes Robotic Process Automation to fill in repetitive information utilizing one or more bots, wherein the one or more bots are first trained to do a repetitive booking generation;

displaying, on a user interface, the recommendation along with a location; and connecting, after completion of the booking, at least a beacon to a handheld device, during the event, thereby enabling communication between the beacon and the handheld device, wherein the beacon repeatedly broadcasts out an identifier and the identifier is picked up by the handheld device; and wherein artificial intelligence-based recommendation engine comprising a collaborative filtering is trained on the data stored in the database and continually learns and adjusts a classifier as new data becomes available;

wherein the system utilizes Robotic Process Automation to fill in repetitive information; and wherein the system is configured to enable the booking of the one of more of the venues, the rooms, and the services and is deployed on a cloud-native platform that is configured to connect directly with the Property Management System to enable a real-time visibility into the inventory of the one or more of the venues, the rooms, and the services.

13. The system of claim 12, wherein the system is further operable to verify an identity of the customer before granting access to the system.

14. The system of claim 12, wherein the artificial intelligence-based recommendation engine comprises a machine learning algorithm.

15. The system of claim 12, wherein the distributed relational database is further configured to be updated dynamically.

16. The system of claim 12, wherein the system is device-independent and can be deployed on multiple platforms through a web portal and/or a mobile app.

17. The system of claim 12, wherein the booking engine is a cloud-native solution configured to access the inventory and reservation of the one or more of the venues, the rooms, and the services.

18. The system of claim 12, wherein the inventory of the one or more of the venues, the rooms, and the services is managed by the Property Management System.

19. The system of claim 12, wherein the system further comprises a dashboard for the service provider of the one or more of the venues, the rooms, and the services configured to enable visibility and accessibility of bookings made by the customer through a Customer Relationship Management unit.

20. The system of claim 12, wherein the system is further configured to: receive a request for a change in at least one of the venues, the rooms, and the services through a user device, of the event;
- generate the recommendation from the inventory of the one or more of the venues, the rooms and the services based upon the request for the change, of the event;
- receive a new selection of one or more of the venues, the rooms, and the services from the recommendation via the user device;
- generate the change in the booking of the one or more of the venues, the rooms, and the services;
- receive payment amount;
- adjust the payment amount according to the change in the booking;
- generate a new order and a new contract for the change in the booking;
- deliver the new order and the new contract electronically to the customer and to the service provider of the one or more of the venues, the rooms, and the services; and
- approve the new order and the new contract by receiving an electronic signature on the new order and the new contract of the event.

* * * * *